(12) United States Patent
Deluca et al.

(10) Patent No.: US 10,547,973 B2
(45) Date of Patent: *Jan. 28, 2020

(54) GROUP IDENTIFICATION AND ACTION

(71) Applicant: International Business Machines Corporation, Armonk, NY (US)

(72) Inventors: Lisa Seacat Deluca, Baltimore, MD (US); Jeremy A. Greenberger, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/271,429

(22) Filed: Feb. 8, 2019

(65) Prior Publication Data

US 2019/0394614 A1    Dec. 26, 2019

Related U.S. Application Data

(63) Continuation of application No. 16/014,344, filed on Jun. 21, 2018, now Pat. No. 10,244,355.

(51) Int. Cl.
*H04W 4/02* (2018.01)
*H04L 12/58* (2006.01)
(Continued)

(52) U.S. Cl.
CPC ........ *H04W 4/023* (2013.01); *G06Q 30/0641* (2013.01); *H04L 51/24* (2013.01); *H04W 4/14* (2013.01)

(58) Field of Classification Search
CPC .... H04W 4/023; G06Q 30/0641; H04L 51/24
(Continued)

(56) References Cited

U.S. PATENT DOCUMENTS 7,930,204 B1 * 4/2011 Sharma .............. G06Q 30/0203
705/7.32
8,463,295 B1    6/2013 Caralis et al.
(Continued)

OTHER PUBLICATIONS

Non-Final Office Action, U.S. Appl. No. 16/014,344, filed Jun. 21, 2018, dated Aug. 29, 2018.
(Continued)

*Primary Examiner* — Nghi H Ly
(74) *Attorney, Agent, or Firm* — Isaac J. Gooshaw, Esq.; George S. Blasiak, Esq.; Heslin Rothenberg Farley & Mesiti PC

(57) ABSTRACT

Methods, computer program products, and systems are presented. The method computer program products, and systems can include, for instance: examining data of a plurality of traveling users, wherein at least some of the plurality of traveling users have associated mobile client computer devices, and determining, by machine logic, based on the examining that certain traveling users of the plurality of traveling users are traveling in a group; deciding, by machine logic, based on the determining that one or more action is to be performed, wherein the deciding is in dependence on a processing of historical data, the historical data specifying activities of the certain traveling users when the certain traveling users travel in a group; and providing one or more output for performance of the one or more action.

20 Claims, 15 Drawing Sheets

(51) Int. Cl.
*H04W 4/14* (2009.01)
*G06Q 30/06* (2012.01)

(58) Field of Classification Search
USPC .......... 455/456.3, 456.1, 404.2, 432.1, 422.1
See application file for complete search history.

(56) References Cited

U.S. PATENT DOCUMENTS

| | | | |
|---|---|---|---|
| 9,091,561 B1* | 7/2015 | Weir | G01C 21/3617 |
| 10,244,355 B1 | 3/2019 | DeLuca | |
| 2013/0225236 A1* | 8/2013 | Lee | G06F 16/58 |
| | | | 455/556.1 |
| 2014/0297337 A1* | 10/2014 | Geraci | G06Q 10/02 |
| | | | 705/5 |
| 2015/0038172 A1 | 2/2015 | Sengupta et al. | |
| 2015/0181481 A1* | 6/2015 | Masini | H04W 36/0083 |
| | | | 455/436 |
| 2016/0350659 A1 | 12/2016 | Tsao | |
| 2016/0353235 A1 | 12/2016 | Williams et al. | |
| 2017/0041741 A1* | 2/2017 | Stevens | H04L 67/18 |
| 2017/0150321 A1* | 5/2017 | Ciecko | H04W 4/029 |

OTHER PUBLICATIONS

Applicant's Response to Non-Final Office Action, U.S. Appl. No. 16/014,344, filed Jun. 21, 2018, dated Sep. 28, 2018.

Notice of Allowance, U.S. Appl. No. 16/014,344, filed Jun. 21, 2018, dated Nov. 8, 2018.

P. Mell, et al. "*The NIST Definition of Cloud Computing*", NIST Special Publication 800-145, Sep. 2011, Gaithersburg, MD.

PAIR Continuity Report for U.S. Appl. No. 16/271,429, filed Feb. 8, 2019, accessed Aug. 27, 2019.

List of IBM Patent and/or Patent Applications treated as related for U.S. Appl. No. 16/271,429, filed Feb. 8, 2019, dated Sep. 27, 2019.

\* cited by examiner

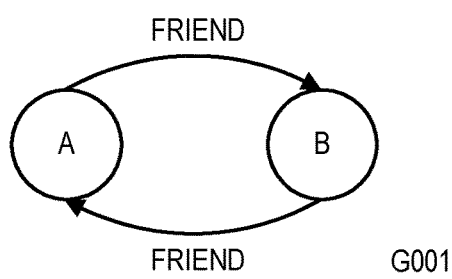
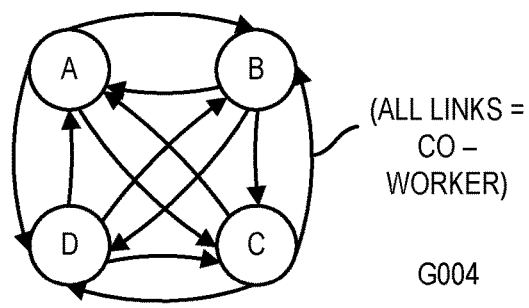
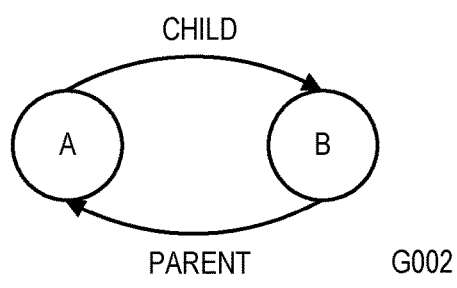
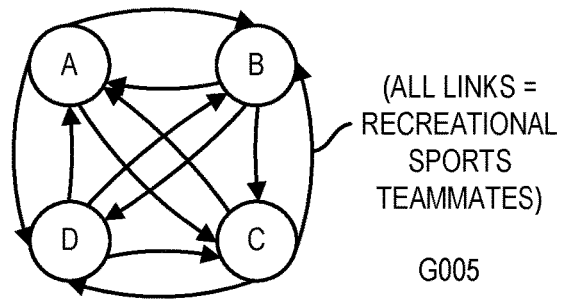
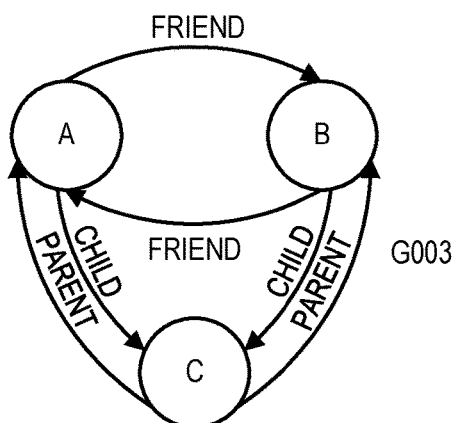
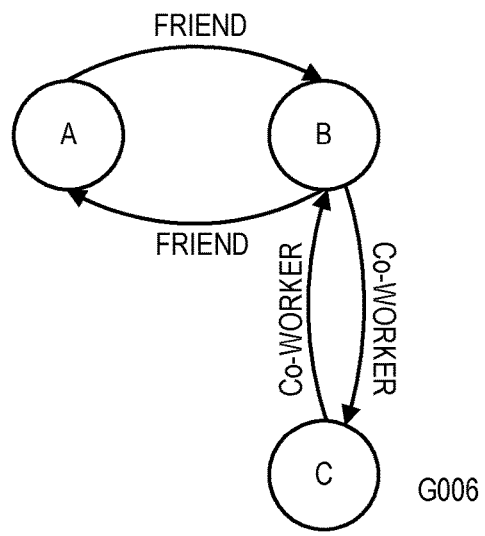
FIG. 7

GROUP IDENTIFICATION AND ACTION

CROSS-REFERENCE TO RELATED APPLICATION

This application is a continuation of U.S. application Ser. No. 16/014,344, filed Jun. 21, 2018, titled "Group Identification and Action", which is incorporated by reference herein in its entirety.

BACKGROUND

Background

Location based services (LBS) are software services that use location data to control functionality of computer systems. LBS information services have a number of uses, e.g. in social networking, entertainment, security, and in a plurality of additional applications. LBS services employ location services for locating mobile computer systems. Location services can incorporate a variety of different locating service technologies such as the Global Positioning System (GPS), cellular network locating technologies, and WiFi based locating technologies, and other technologies. One example of an LBS is a location based messaging services wherein notifications and other messages to users can be in dependence on the respective locations of the users.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: examining data of a plurality of traveling users, wherein at least some of the plurality of traveling users have associated mobile client computer devices, and determining, by machine logic, based on the examining that certain traveling users of the plurality of traveling users are traveling in a group; deciding, by machine logic, based on the determining that one or more action is to be performed, wherein the deciding is in dependence on a processing of historical data, the historical data specifying activities of the certain traveling users when the certain traveling users travel in a group; and providing one or more output for performance of the one or more action.

In another aspect, a computer program product can be provided. The computer program product can include a computer readable storage medium readable by one or more processing circuit and storing instructions for execution by one or more processor for performing a method. The method can include, for example: examining data of a plurality of traveling users, wherein at least some of the plurality of traveling users have associated mobile client computer devices, and determining, by machine logic, based on the examining that certain traveling users of the plurality of traveling users are traveling in a group; deciding, by machine logic, based on the determining that one or more action is to be performed, wherein the deciding is in dependence on a processing of historical data, the historical data specifying activities of the certain traveling users when the certain traveling users travel in a group; and providing one or more output for performance of the one or more action.

In a further aspect, a system can be provided. The system can include, for example a memory. In addition, the system can include one or more processor in communication with the memory. Further, the system can include program instructions executable by the one or more processor via the memory to perform a method. The method can include, for example: examining data of a plurality of traveling users, wherein at least some of the plurality of traveling users have associated mobile client computer devices, and determining, by machine logic, based on the examining that certain traveling users of the plurality of traveling users are traveling in a group; deciding, by machine logic, based on the determining that one or more action is to be performed, wherein the deciding is in dependence on a processing of historical data, the historical data specifying activities of the certain traveling users when the certain traveling users travel in a group; and providing one or more output for performance of the one or more action.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 7 depicts a plurality of relationship graphs associated to a plurality of respective traveling group according to one embodiment;

DETAILED DESCRIPTION

Figure 1:
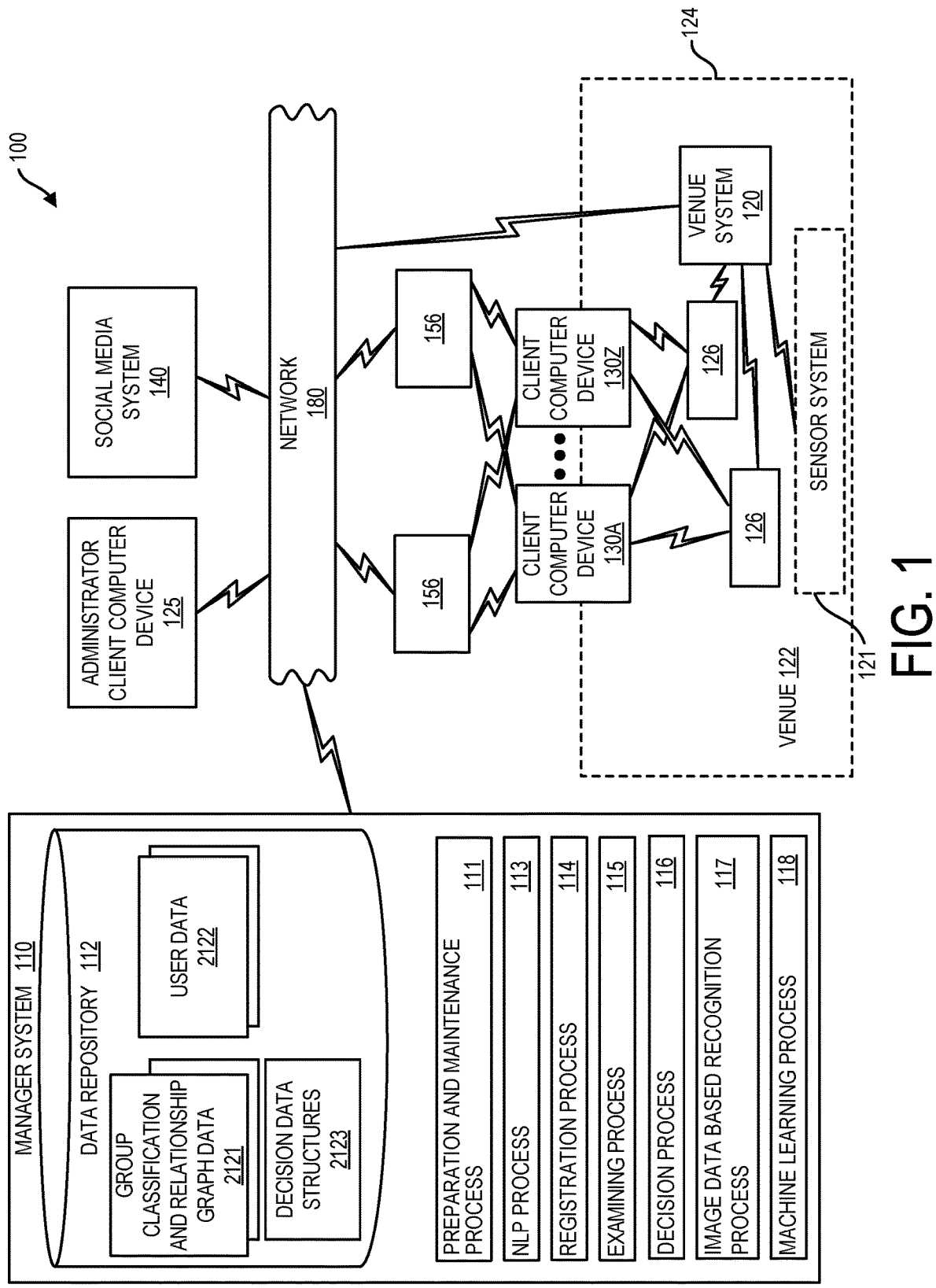
FIG. 1 is a block diagram depicting a system having a manager system, a venue system, and computer devices according to one embodiment.

System 100 for examining data of traveling users providing action decisions is shown in FIG. 1. System 100 can include manager system 110 having an associated data repository 112, client computer devices 130A-130Z, venue system 120, administrator client computer device 125, social media system 140. Venue system 120 can be disposed in venue 122 delimited by a venue spatial geographical border 124. User computer devices 130A-130Z can be in communication with one another via network 180, e.g. via connecting nodes 156 and/or connecting nodes 126, which connecting nodes can be in communication with venue system 120 which in turn can be in communication with network 180. Connecting nodes 156 can be e.g. connecting nodes of a cellular service wide area network (WAN). Connecting nodes 126 can be connecting nodes of a wireless local area network (WLAN). System 100 can include numerous devices which can be computing node based devices connected by network 180. Network 180 may be a physical network and/or a virtual network. A physical network can be, for example, a physical telecommunications network connecting numerous computing nodes or systems, such as computer servers and/or computer clients. A virtual network can, for example, combine numerous physical networks or parts thereof into a logical virtual network. In another example, numerous virtual networks can be defined over a single physical network.

Manager system 110 can determine a current location of user computer devices 130A-130Z employing various locating technologies, e.g. based on radio signals obtained by connecting nodes 156 and/or connecting nodes 126. Locating technologies can utilize, e.g. time of flight and/or triangulation analyses. Within venue 122 there can be disposed one or more sensor system 121 in communication with venue system 120 and in turn with network 180. One or more of sensor system 121 can be, e.g. a video camera system which obtains video data of various locations, e.g. in one embodiment comprising an entirety of a patron floor space of venue 122 and which in one embodiment can include additionally or alternatively video cameras disposed in each shopping cart within a venue 122. One or more sensor system 121 can also in one embodiment include, e.g. an RFID sensor system for tracking RFID products disposed within venue 122.

In one embodiment one or more sensor system 121 can include a beacon zone sensor system for use in sensing locations of client computer devices 130A-130Z within specified zones of venue 122. As set forth herein user computer devices 130A-130Z can further include GPS sensors providing location data that specifies locations of user computer devices 130A-130Z. In one embodiment manager system 110 can be external to and remote from venue system 120, social media system 140, administrator client computer device 125, and each of the one or more of user computer devices 130A-130Z for use by users of system 100. In one embodiment manager system 110 can be co-located with one or more venue system 120 and/or social media system 140. In one embodiment manager system 110 can be co-located with administrator client computer device 125 and/or one or more user computer device 130A-130Z. Administrator client computer device 125 can be used by human administrator users of system 100. Client computer devices 130A-130Z can be used by human users of system 100.

Referring further to FIG. 1, venue system 120 can be located in venue 122 that is delimited by venue spatial geographical border 124 that specifies the geographical coordinate area occupied by venue 122. In one embodiment an organizational enterprise that operates manager system 110 can be in common with the organizational enterprise that operates venue system 120 and venue 122. Venue 122 can be a retail venue in one embodiment. Venue system 120 can be disposed in venue 122 defining venue spatial geographical border 124. User computer devices 130A-130Z can be mobile computer devices moveable between locations internal and external to venue 122, and thus are shown in FIG. 1 as being partially disposed within venue spatial geographical border 124 and partially disposed external to venue spatial geographical border 124.

Client computer devices 130A-130Z can be wireless computer devices that can be connected to network 180 by alternate radio communication protocols. For example, client computer devices 130A-130Z can connect to network 180 by connecting nodes 156. Connecting nodes 156 can be connection nodes that facilitate connection to cellular communication network. Client computer devices 130A-130Z can also be connected to network 180 via connecting nodes 126. Connecting nodes 126 can be provided by IEEE 802.11 access points from a WIFI wireless network provided by an operator of venue system 120. Client computer devices 130A-130Z can be provided by, e.g. smartphones and/or smart watches. Each of the different users of client computer devices 130A-130Z can be associated to a different user. Regarding client computer devices 130A-130Z, a user of one or more user client computer devices 130A-130Z in one embodiment can be a computing node based devices provided by a user computer, e.g. a mobile device, e.g. a smartphone, tablet, laptop, smartwatch, or PC that runs one or more program, e.g. including a web browser for viewing webpages.

Social media system 140 can include a collection of files including for example, HTML files, CSS files, image files, and JavaScript files. Social media system 140 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system. Text based notifications that can be sent by manager system 110 as set forth herein can be messages transmitted, e.g. using social media system 140, an SMS text based messaging delivery system, and/or an e-mail delivery system as set forth herein.

Embodiments herein recognize that users, e.g. who may be potential patrons of venues for services can behave differently when they are traveling in a group as opposed to when they are traveling alone. Embodiments herein therefore are set forth to identify when a user is traveling in a group of users and to return classifying information for the group in which the traveling user is traveling. Group classifying information identifiers can include, e.g. group general classifiers and/or group specific classifiers.

On the identification of a group, manager system 110 can be configured to decide one or more action to be performed. The action can be an action, e.g. to encourage certain behavior or to discourage certain behavior of a user of the identified group or users within the identified group. The actions can be actions to optimize crowd control in potentially crowded venue environments, e.g., for improvement of services provided to users traveling in groups and accordingly to reduce line formation and congestion in a variety of venues traveled to by such groups.

Manager system 110 can run various processes, including preparation and maintenance process 111, Natural Language Processing (NLP) process 113, registration process 114, examining process 115, image data based recognition process 116, decision process 117, and machine learning process 118.

Data repository 112 of manager system 110 can include classification and relationship graph data area 2121, user data area 2122, and decision data structures area 2123.

Manager system 110 can run preparation and maintenance process 111 to obtain data from various sources within system 100 and can store such data into various areas of data repository 112, such as user data area 2122.

Manager system 110 can run NLP process 113 to structure obtained unstructured data having language elements, e.g. typed text or spoken words. NLP process 113 can return topic and/or a sentiment data be processing unstructured data having a language element.

Manager system 110 running registration process 114 can facilitate user registration with system 100. For example, manager system 110 can serve web pages defining registration user interfaces that allow new users who are users of user computer devices 130A-130Z to register with system 100. System 100 can be configured so that registered users of system 100 can enjoy services provided by manager system 110. As noted, in one embodiment manager system 110 can be a manager system 110 operated by an enterprise operator of venue 122. In one embodiment an enterprise operating venue 122 can operate venue 122 and a plurality of venues similarly configured to venue 122, e.g. each having the elements depicted in FIG. 1.

According to one embodiment, manager system 110 can provide services to a plurality of different enterprises. In such an embodiment manager system 110 can provide shopper assistance services to a plurality of users who may shop at venue 122 operated by a first organizational entity enterprise and a plurality of different venues configured according to venue 122 but operated by different organizational entities. In such an embodiment, registration with system 100 by a user provides the user with general shopping aid services, improving experiences at a plurality of venues that can be operated by a plurality of different operational entities.

Manager system 110 running examining process 115 can include manager system 110 examining data of users of system 100. Manager system 110 running examining process 115 can, e.g. identify a certain user traveling between various locations within system 100, e.g. within a venue or between venues for example. Manager system 110 running examining process 115 and on the identification of a certain user, can look for users traveling with the certain user. Such examining can include, e.g. using location data associated with users stored in user data area 2122 of data repository 112 and/or real-time location data collected by system 100.

On the identification of a certain user of manager system 110 running examining process 115, can determine that there is at least one other user currently in proximity with the certain user. Based on the determination that there is at least one or more other user in proximity with the certain user, manager system 110 running examining process 115 can examine historical location data of the certain user and the proximate one or more users to determine that the certain user and the one or more additional user have remained in proximity with one another for more than a threshold period of time, and can thus determine that the certain user and the one or more additional user define a group of traveling users.

Manager system 110 running examining process 115 on the determining that there is a group of traveling users can establish a relationship graph for the group of traveling users. On the establishing of a relationship graph for an identified group of traveling users, manager system 110 running examining process 115 can determine whether there is a prior registered classification, e.g. general and/or specific, and if there are prior registered classification(s) can associated the current classification to a prior classification. If there is no prior classification, manager system 110 running examining process 115 can create a new classification, e.g. general and/or specific.

Manager system 110 running examining process 115 can include manager system 110 running image data based recognition process 117. Where users of system 100 are registered users of system 100, registration may include consent to provide location data and thus tracking locations of users can be particularly straightforward and can include tracking user IDs and associated locations as provided by one or more location providing service, e.g. one or more radio signal based location service, e.g. provided with use of cellular service locating services, WIFI based locating services, and/or GPS based locating services. Manager system 110 running image data based recognition process 116 can be particularly useful for recognizing unregistered users, e.g. for which system 100 has not allocated a registered user ID. Manager system 110 running image data based recognition process 116 can include manager system 110 performing facial recognition using image data, e.g. video data provided using camera system of sensor system 121. Manager system 110 can allocate unregistered user IDs to users who are not registered users but who are nevertheless recognized by system 100 by running of image data based recognition process 116. IBM® VISUAL RECOGNITION® services can be utilized for performance of facial recognition. (IBM® and VISUAL RECOGNITION® are registered trademarks of International Business Machines Corporation).

Manager system 110 running decision process 117 can include manager system 110 using one or more decision data structure of decision data structures area 2123 to provide action decisions. Manager system 110 in response to providing one or more action decision can provide one or more output to perform one or more action in accordance with the one or more action decision. According to one embodiment, manager system 110 running decision process 117 can use a decision data structure that associates one or more condition to one or more action specifier. One or more condition can be for example, the existence of the traveling group classification. The classification can include, e.g. a general group classification and/or a specific group classification.

Manager system 110 running machine learning process 118 can perform machine learning training to optimize decisions produced by running of decision process 117. Manager system 110 running machine learning process 118, can for example train a reinforcement model 8006 so that poorly performing decisions produced by running of decision process 117 can be dropped and replaced by updated action decisions. Manager system 110 running machine learning process 118 can for example train a predictive model that produces optimally performing action decisions.

Data repository 112 in classification and relationship graph data area 2121 can store data that defines traveling group classifications that have been established by system 100 and which if previously established can be recognized by system 100. According to one embodiment, each traveling group classification can include an associated relationship graph that defines relationships between users of the traveling group. According to a relationship graph for use by system 100, nodes of a relationship graph can specify different users of system 100 and edges between the nodes can specify relationships between the users, e.g. such relationships as "friend", "child", "parent", "coworker", or "sports teammate".

Data repository 112 in user data area 2122 can store data on users of system 100. Users can include registered users or unregistered users. Registered users can be users who have registered with system 100 to obtain services provided by system 100. According to one embodiment, a user on registration with system 100 can consent to access of location data of the registering user and such location data over time can be included in user data of user data area 2122. On registration a user can also, e.g. consent to access of data to data of social media system 140, which data can thereafter be subject to examination by manager system 110 for various uses, e.g. determining relationships between users. On registration, a user can also, e.g. consent to access of purchase historical data of a user, which data can thereafter be subject to examination by manager system 110 for various uses, e.g. determining purchase activities of users when traveling in a group. Purchase historical data for storage into user data area 2122 can be obtained from venue system 120 and/or one or more enterprise system (not shown) associated to venue system 120. User data area 2122 can also include data on unregistered users of system 100 such as users who may be recognized by manager system 110 by running of image data based recognition process 116 and who may be allocated unregistered user identifiers.

Data repository 112 in decision data structures area 2123 can include one or more decision data structure for use in providing action decisions by manager system 110 running decision process 117 as set forth herein. A decision data structure of decision data structures area 2123 according to one embodiment can be iteratively updated by running of machine learning process 118.

Figure 2:
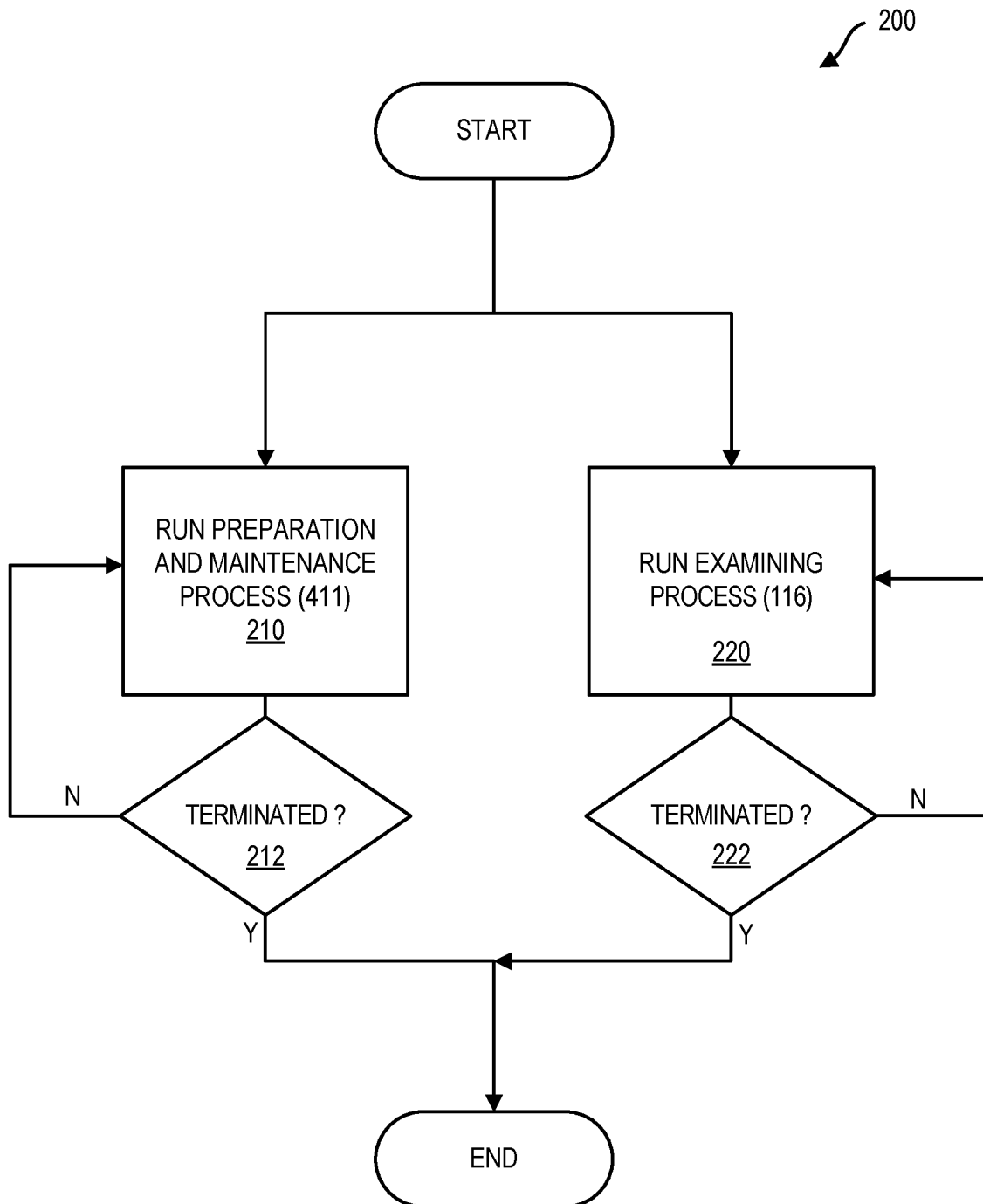
FIG. 2 is a flowchart illustrating a method for performance by a manager system according to one embodiment.

A method 200 for performance by manager system 110 is set forth in reference to the flowchart of FIG. 2. At block 210, manager system 110 can run preparation and maintenance process 111 to populate, prepare, and maintain various data of data repository 112 including data of classification and relationship graph data area 2121, user data area 2122, and decision data structures area 2123. Manager system 110 can run preparation and maintenance process 111 until preparation and maintenance process 111 is terminated at block 212. At block 220, manager system 110 can run examining process 115 until examining process 115 is terminated at block 222. Manager system 110 can run preparation and maintenance process 111 and examining process 115 concurrently and can run each of process 111 and process 115 iteratively.

A method 300 for performance by manager system 110 is illustrated with reference to FIG. 3. At block 310, manager system 110 can perform examining data of a plurality of traveling users, and based on the examining determining, by machine logic, that certain traveling users of the plurality of traveling users are traveling in a group, and classifying the certain traveling users as belonging to a certain one or more group classification. At block 320, manager system 110 can include deciding, by machine logic, based on the classifying that one or more action is to be performed. At block 330, manager system 110 can include providing one or more output to provide performance of the one or more action.

Figure 3:
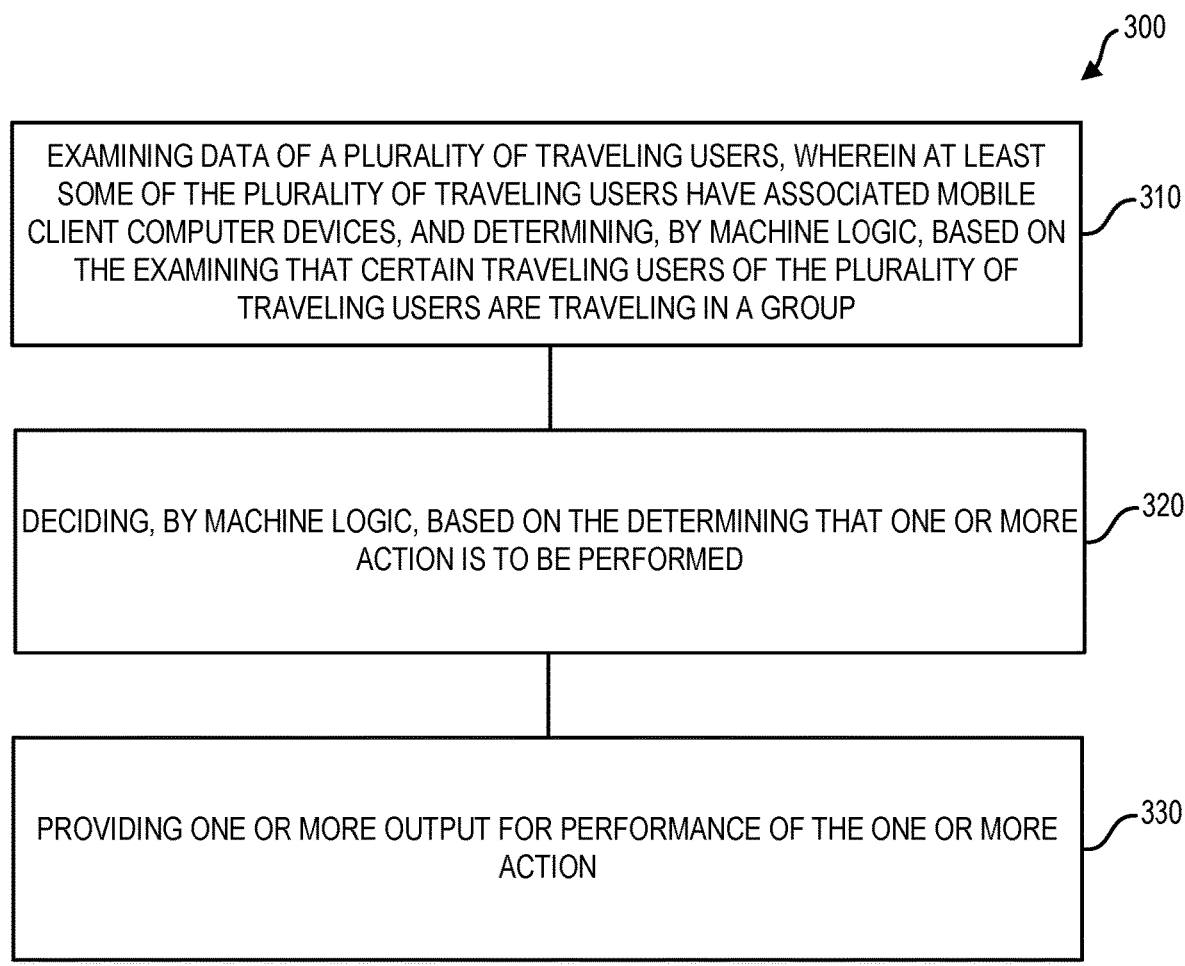
FIG. 3 is a flowchart illustrating a method for performance by a manager system according to one embodiment.
Figure 4:
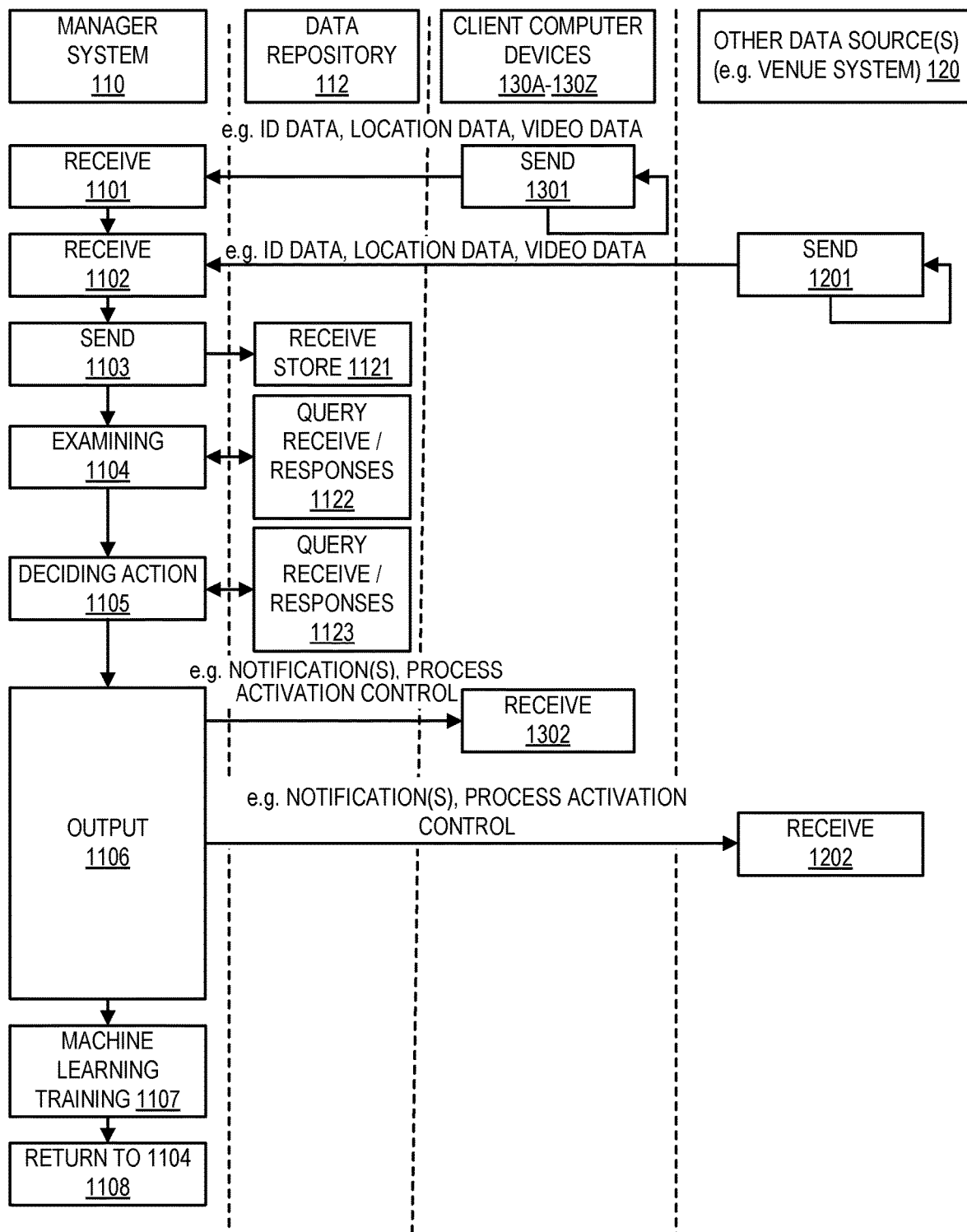
FIG. 4 is a flowchart illustrating a method for performance by a manager system interoperating with other components according to one embodiment.

A specific example of method 300 set forth in the flowchart of FIG. 3 is described in reference to the flowchart of FIG. 4 depicting operations of manager system 110 interoperating with user computer devices 130A-130Z and other data sources, e.g. venue system 120.

Referring to the flowchart of FIG. 4, manager system 110 at block 1101 and 1102 can be receiving respectively data from user computer devices 130A-130Z and from other sources, e.g. venue system 120. Received data received at block 1101 sent by user computer devices 130A-130Z at block 1301 can include, e.g. user ID data, location data, e.g. GPS location data, and video data, e.g. smartphone obtained video data obtained by user computer devices of user computer devices 130A-130Z. The received data received by manager system 110 at block 1102 received by the sending of data from other data sources at block 1201 can include, e.g. location data, e.g. cellular system derived, WIFI system derived, venue beacon system derived, video system derived location data, and/or video data e.g. video data provided by an in-venue camera system of one or more sensor system 121 (FIG. 1). As indicated in the flowchart of FIG. 1, the sending of data by user computer devices 130A-130Z to manager system 110 for receipt by manager system 110 at block 1101 can be iteratively performed on a continuing and ongoing basis. Likewise, the sending of data at block 1201 by other data sources to manager system 110 for receipt by manager system 110 at block 1102 can be iteratively performed on a continuing and ongoing basis. Thus, manager system 110 can iteratively be performing the receiving of data at block 1101 and 1102.

In response to the receipt of data at blocks 1101 and 1102, manager system 110 at block 1103 can store data of the received data into data repository 112. With the sending at block 1103 of data to data repository 112, manager system 110, e.g. for certain types of data can perform processing of the data to structuralize the data. In some instances, manager system 110 at block 1103 can send to data repository 112 for receipt and storage at block 1121 unstructured data together with metadata labels derived from processing performed at block 1103. In some instances, e.g. for certain other types of data, manager system 110 at block 1103 can perform processing of data to generate label data, e.g. parameter label data and can discard the unstructured data processed to derive the parameter data prior to sending of the parameter data to data repository 112 for receipt and storage by data repository 112 at block 1121.

Manager system 110 at block 1104 can perform examining of data obtained based on the received data at blocks 1101 and 1102, return classifications of users as traveling groups of users. Manager system 110 at block 1105, e.g. using one or more decision data structure can perform the deciding of one or more action to be performed. The deciding at block 1105 can be performed based on a classifying performed by the examining at block 1104. Manager system 110 for performing each of blocks 1104 and 1105 can perform multiple queries for data stored in data repository 112, e.g. in areas 2121 and 2122 thereof as indicated by query receive and respond block 1122 and query receive and respond block 1123 performed by data repository 112.

Based on one or more action decision determined by manager system 110 at block 1105, manager system 110 can proceed to block 1106. At block 1106 manager system 110 can provide one or more output. The one or more output provided at block 1106 can include one or more output to perform the action decision returned at block 1105. Manager system 110 providing one or more output at block 1106 can include manager system 110, e.g. sending one or more notification and/or one or more process activation control for receipt by user computer devices of user computer devices 130A-130Z at block 1302. Manager system 110 providing one or more output at block 1106 can include manager system 110 providing one or more notification and/or one or more process activation control for receipt by other data sources, e.g. venue system 120 for receipt by other data sources, e.g. venue system 120 at block 1202. Manager system 110 sending notifications at block 1106 can include manager system 110 sending text based notifications, e.g. through the messaging service provided by social media system 140 and/or by another messaging service as set forth herein. Manager system 110 in response to the providing one or more output at block 1106 can proceed to block 1107 to perform machine learning training so that action decisions provided at block 1106 can be optimized. At block 1107 manager system 110 can return to block 1104 to perform further examining of obtained data obtained based on the iteratively received data at blocks 1101 and 1102. It will be understood that manager system 110 can be always performing simultaneously and concurrently a plurality of instances of examining block 1104, deciding action block 1105, and providing one or more output block 1106, as well as machine learning training block 1107.

Figure 5A:
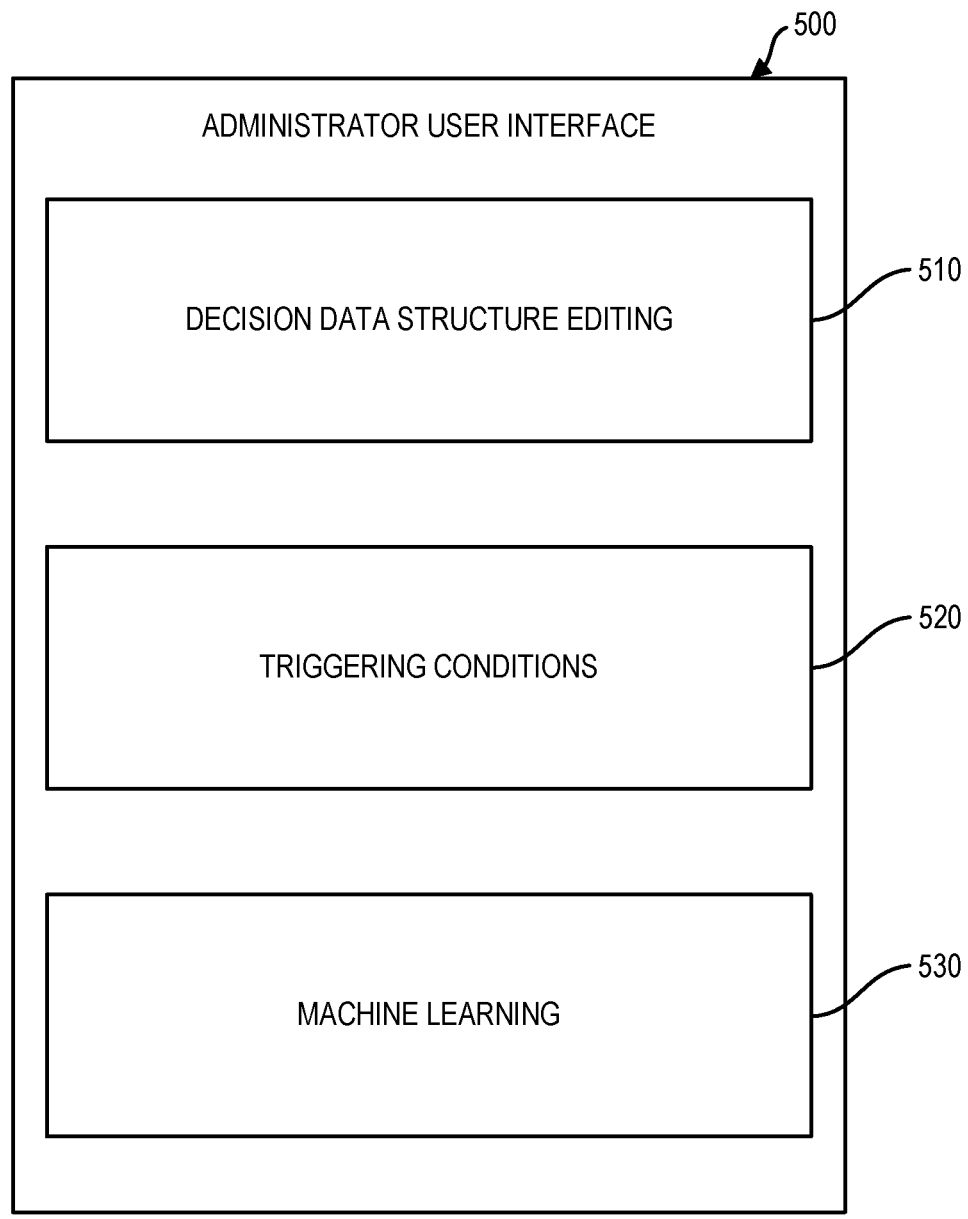
FIG. 5A depicts an administrator user interface according to one embodiment.

Referring now to FIG. 5A, an administrator user interface 500 that can be displayed on a display of administrator client computer device 125 is depicted. An administrator user can configure manager system 110 to perform functions set forth herein using administrator user interface 500. Using area 510 an administrator user can specify, e.g. conditions and/or specified actions of a decision data structure as set forth herein. Using area 520 an administrator user can configure triggering conditions, e.g. triggering conditions which can cause manager system 110 to perform examining at block 1104. In some embodiments, manager system 110 can be configured to essentially operate to identify traveling groups of users independent of any triggering condition. Embodiments herein recognize that such processing can possibly consume considerable resources and accordingly triggering conditions using area 520 can be specified. For example, using area 520 an administrator user can specify that manager system 110 is to perform examining at block 1104 with respect to a certain user responsively to a user breaching a geofence, e.g. a geofence established within a venue such as venue 122 (FIG. 1) or external to a venue. Using area 520 according to one embodiment an administrator user can establish a geofence to coincide with venue spatial geographical border 124 specifying the spatial area occupied by venue 122. With such configuration manager system 110 can be configured to perform examining at block 1104 based on a certain user breaching venue spatial geographical border 124 depicted in FIG. 1. Using area 530 of administrator user interface 500 an administrator user can specify machine learning configuration parameters, e.g. respecting the data used for training of trained machine learning models that are used for the return of action decisions, the platforms used for providing trained machine learning models, update schedules for training of machine learning models, and the like.

Figure 6A:
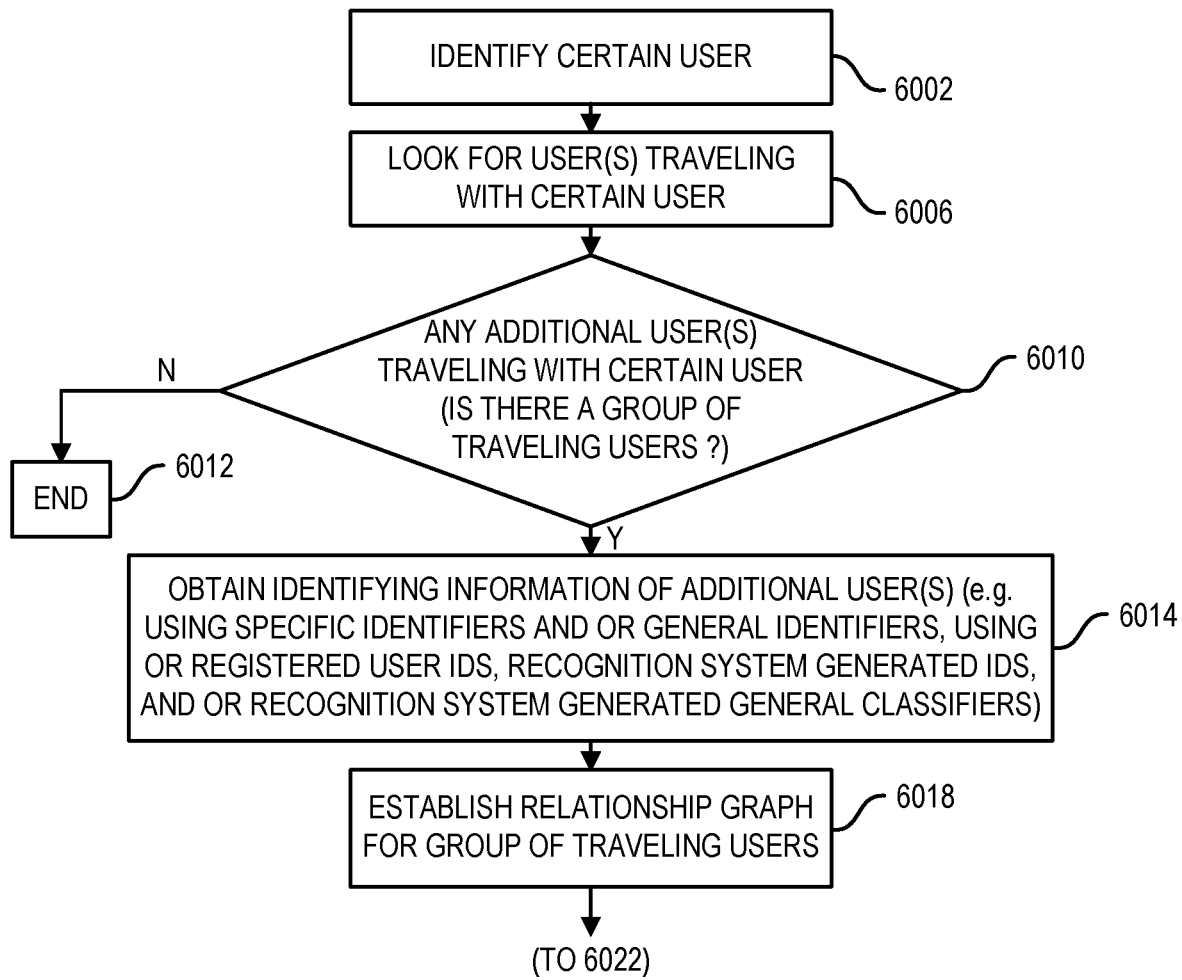
FIGS. 6A-6B is a flowchart illustrating a method for performance by a manager system according to one embodiment.
Figure 6B:
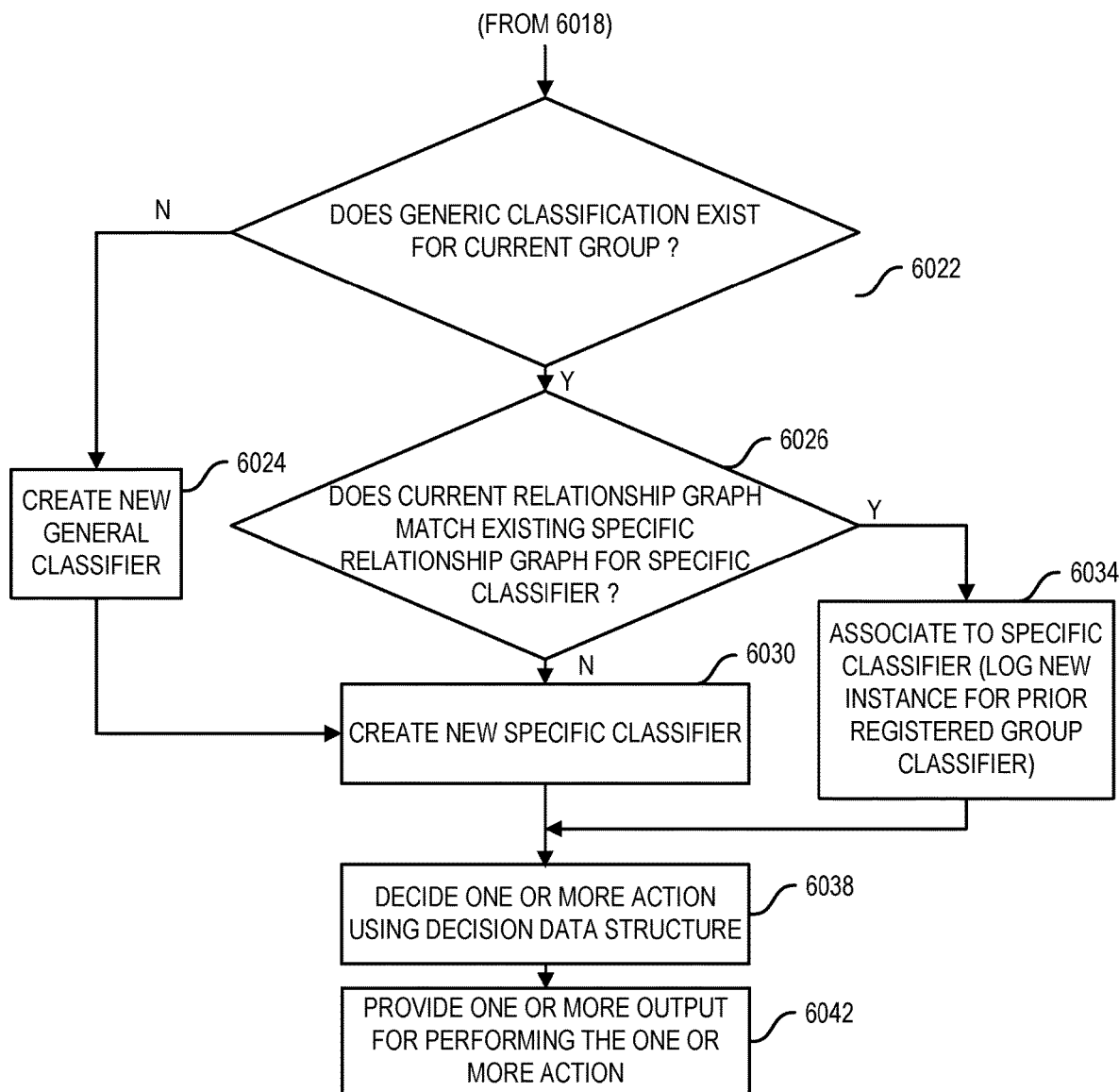

A specific example of manager system 110 performing deciding action block 1105 and providing one or more output block 1106 is set forth in reference to the flowcharts of FIGS. 6A and 6B. At block 6002 manager system 110 can perform identifying of a certain user within system 100, e.g. based on a triggering condition being satisfied or without a triggering condition being satisfied. At block 6006 manager system 110 can perform looking for additional user(s) traveling with a certain user identified at block 6002. At block 6006 for example, manager system 110 can examine live location data received at block 1101 and/or block 1102 and discern that based on such location data that a certain user, e.g. a user of user computer device 130A is currently within a threshold distance of one or more additional user. Based on a determination that the certain user is currently within proximity of one or more additional user, manager system 110 can responsively examine location historical data of user data stored in user data area 2122 of data repository 112 to ascertain whether those additional one or more users have been in proximity with the certain user for greater than a threshold period of time. Based on the determination that multiple users have been traveling together for more than a threshold period of time, manager system 110 can at block 6010 determine that there exists a traveling group of users, and can proceed to block 6014 to associate identifying information of a group of users defining a traveling group of users. If at block 6010 manager system 110 determines that the certain user identified at block 6002 is traveling alone, i.e. is not traveling in a group, processing can end at block 6012.

Embodiments herein recognize that users, e.g. who may be potential patrons of venues for products can behave differently when they are traveling in a group as opposed to when they are traveling alone. Embodiments herein therefore are set forth to identify when a user is traveling in a group of users and to return classifying information for the group in which the traveling user is traveling. Group classifying information identifiers can include, e.g. group general classifiers and/or group specific classifiers.

Manager system 110 on the determination that there is a group of traveling users at block 6010 can proceed to block 6014. At block 6014 manager system 110 can obtain identifying information of additional user(s) identified as belonging to a group. For example, where all users of an identified traveling group of users are registered users of system 100, manager system 110 at block 6014 can associate registered user IDs of all such users. In some embodiments, manager system 110 at block 6014 can associate registered user IDs allocated to registered users with unregistered user IDs allocated to unregistered users, e.g. users who are recognized and allocated unregistered user IDs based on performance of image data based recognition process 116 (FIG. 1). Based on obtaining identifying information of additional user(s) at block 6014, manager system 110 can proceed to block 6018 to establish a relationship graph for the current identified group of traveling users. Establishing a relationship graph at block 6018 can include manager system 110 establishing identified users defining a group as nodes within a relationship graph and further establishing relationships between such users as edges in defined relationship graphs so that in an established relationship graph established at block 6018, there are users identified by nodes of the graph and wherein edges between the node specify relationships between the users. Example of edge relationship specifying labels can include, e.g. "friend", "child", "parent", "coworker", or "sports teammate". Establishing of relationship graph edge data at block 6018 can include examining of various types of data. For example, establishing of relationship graph edge data at block 6018 can include manager system 110 examining social media system data of social media system 140 to determine that first and second users are, e.g. friends in relation to one another, child and parent in relation to one another, coworkers in relation to one another, or sports teammates, e.g. amateur recreational sports teammates in relation to one another, and so forth.

Manager system 110 at block 6018 can include manager system 110 examining other types of data for determining relationships between users, e.g. can be running image recognition processes by activation of image data based recognition process 117 to determine, e.g. that first and second users are of disparate ages and sizes and accordingly with such determinations return labels specifying a parent/child relationship between the first and second users. In another example of image data processing that can be performed at block 6018, manager system 110 at block 6018 can perform image data processing by activation of image data based recognition process 117 to return a determination that users of a traveling group are all in a common recreational sports uniform, to thereby return the determination that the traveling group of users are of a common sports team and are related to one another as being sports teammates.

Manager system 110 on the establishing of a relationship graph for a current group of traveling users at block 6018 can proceed to block 6022. At block 6022, manager system 110 can determine whether a generic classification exists for the current identified group, for which a relationship graph is established at block 6018. If no, manager system 110 can proceed to block 6024 and at block 6024 manager system 110 can create a new general classifier for the newly identified traveling group identified at block 6010. If manager system 110 at block 6022 determines that a current established relationship graph is associated to a previously registered generic group classification, manager system 110 can proceed to decision block 6026. At decision block 6026, manager system 110 can determine whether the relationship graph of a current group of traveling users established at block 6018 matches a previously registered existing specific relationship graph associated to a previously registered specific traveling group classifier. If yes, manager system 110 can proceed to block 6034 to associate a currently established relationship graph to a previously registered specific group classifier. If at decision block 6026 manager system 110 returns a "no" decision, manager system 110 can proceed to block 6030. At block 6030 manager system 110 can create a new specific traveling group classifier for the established relationship graph established at block 6018. On the completion of block 6030 or 6034 manager system 110 can proceed to block 6038 to decide one or more action using one or more decision data structure stored in decision data structure area 2123 of data repository 112.

The decision data structure used for return of an action decision can include any number of firing conditions and/or action decisions. In one embodiment the action conditions can be the conditions that can be specified in a deployed decision data structure can include, e.g. the condition that the general traveling group classifier is recognized at block 6022 and/or that a specific traveling group classifier is recognized at block 6026. An example decision data structured is shown in Table A.

TABLE A

| Row | General Classifier | Specific Classifier | Edge Condition | Action 1 | Action 2 |
|---|---|---|---|---|---|
| 1 | G005 (Teammates) | Any | Any | Notification promoting next local live sporting event | Open and Run peer to peer sharing among all teammates |
| 2 | Any | Any | ≥2 "child" | Notification for "2 for 1" children's meal | |
| 3 | G005 (Teammates) | P006 (Wildcat Teammates) | Any | Auto-place "favorite" order group consumed item (a pizza). | Auto-tune TV to local for pro sports team of same sport |
| 4 | G001 (Friends) | P014 (Doe Friends) | Any | Notification to Arvis to buy coffee; notification to Betty to buy hot chocolate; automatically place the orders for Arvis's favorite and Betty's favorite | |
| 5 | G001 (Friends) | P017 (Smith Friends) | Any | Notification to Amy to buy cookies, notification to Barb to buy cake; automatically place the orders for Amy's favorite and Barb's favorite | Open and run peer to peer sharing by friends |
| 6 | G001 (Friends) | Any | Any | Notification promoting movie night. | |
| 7 | Any | Any | ≥2 "coworker" | Notification promoting conference room availability | |
| 8 | G003 (Friends and Child) | P023 (Smith Group) | Any | Notification that Acme Pizza is approaching and that order has been placed; auto-place the order for the favorite | Activate oven to cook pizza for Smith Group. |

As set forth in Table A, firing conditions can include such firing conditions as a presence of a group matching a general traveling group classifier being recognized and/or a traveling group matching a registered specific group classifier being recognized. Illustrative traveling group classifiers are described with reference to FIG. 7. As noted, each group classifier can include a group classifier identifier, e.g. a group classifier ID, a group classifier name, and an associated generic relationship graph that specifies relationships between users defining the traveling group. As illustrated in FIG. 7, the "friends" traveling group classification can be characterized by first and second users who are in friend relation to one another. Friends traveling group classification can have the general traveling group ID G001. Referring further to FIG. 7, the parent child traveling group classification having the general traveling group ID G002 can be characterized by first and second users being in child and parent relation to one another. Additional single parent and child general classifiers can be provided including one parent associated to N children. Still referring to FIG. 7, the traveling group classifier identified by the classifier ID G003 can be characterized by first and second users who are friend relation to one another and a third user who are in parent and child relation to each of the first and second user. The traveling group classifier specified by the group ID G003 can be referred to as friends and child group classifier. It will be seen that other traveling group classifiers can be characterized as friends and children (e.g. 2 to N children) classification. It will be seen that other general classifiers for the case of friend with N children can be provided. Traveling group classifiers specified by the traveling group ID G004 can be characterized by a plurality of users, each being related to one another as coworkers. The traveling group ID G004 depicts the use case of four traveling coworkers traveling as a group, however it will be understood that additional traveling group identifiers can be provided by different numbers of coworkers. In any of the embodiments described with reference to the decision data structure of Table A manager system 110 can be configured so that examining at block 1104 is triggered in response to a user breaching a geofence, e.g. a geofence established at venue spatial geographical border 124 as set forth herein.

Edges in a relationship graph having associated users who are coworkers can include additional refined information as to the relationship between the coworkers, specifying e.g. that a first worker is a subordinate of or alternatively a manager of another coworker. The traveling group classifier G004 is a classifier a group of traveling users wherein each of the users has the relationship of recreational sports teammate to each other user. The group ID G004 depicts a group size of four sports teammates and it will be noted that additional generic group IDs can be provided for sports teams of other sizes. The traveling group classifier ID G006 depicted in Table A is a classifier for a traveling group characterized by a first and second users being in friend relation to one another and a third user being in a coworker relation to the second user. It will be seen in reference to the example of the traveling group classifier G006, that traveling groups can take on a wide range of characteristics, e.g. when the traveling group having a diverse arrangement of relationships between group members who are users of system 100.

Referring to Row 1 of the decision data structure of Table A, the firing condition is the identification of a traveling group associated to the previously registered G005 (teammates) traveling group general classifier ID. Specified actions associated to the firing condition can include first and second actions. The first action can be e.g. sending of a notification promoting a next live sporting event. Actions can specify a text based notification sent to all registered users defining the group of teammates. Processing can require that the next live sporting event specified with the notification is of a common sport in common with the sport being played by the group of users forming the group recognized as belonging to the general classifier ID G005. Discriminating which sport the group plays can be performed in various ways, e.g. by activation of NLP process 113 to return topic classifiers associated with text of examined social medial text of social media system 140, authored by users of the group and/or by image data processing performed by activation of image data based recognition process 116. Actions specified by decision data structure of Table A can include actions to send text based notifications and/or other actions, e.g. actions to activate processes, e.g. such as the opening and running of new applications running on one or more computing node, the control of a radio transceiver which can be associated to the running of a new application, the control of a machine process, e.g. to guide crowd control or to control machines to perform services to the benefit of users, e.g. starting an oven or another food service machine process.

With further reference to the decision data structure of Table A, there is a second action associated to the Row 1 firing condition. Also associated with the firing condition of Row 1 being satisfied, is the action "open and run peer to peer sharing among all teammates." The specified action "open and run peer to peer sharing among all teammates" can result at block 1106 to provide one or more output to open an application that controls a radio transceiver of a user computer device associated with each user of the group so that each user of the group can engage in peer to peer data sharing with each other member of the group.

Regarding the firing condition specified in Row 2 of the decision data structure of Table A, the firing condition specified is that a relationship graph established at block 6018 of the flowchart of FIGS. 6A-6B, has two or greater "child" edges specified. Based on that firing condition being satisfied, the action to send a notification promoting a 2 for 1 children's meal can be sent and/or a process control action can be specified. Row 2 illustrates that firing conditions can be specified even where a current identified group of traveling users is not associated with any previously registered group classifier.

As to Row 3, with further reference to the decision data structure of Table A, the Row 3 firing conditions can be satisfied when the traveling group is recognized as being the previously registered group having the specific group classifier P006. Based on historical data of that traveling group who have been recognized by system 100 to have traveled together previously as a group, action 1 and action 2 can be specified. Action 1 can be the action to auto-place the favorite order for that group, e.g. two orders of hamburgers and fries and two orders of hot dogs and coleslaw. Also associated with action 1 of Row 3 can be notifications transmitted to each user of the group that specify that the indicated favorite order has been placed to facilitate overriding of that selection by any one of the users. A second action can be associated to row 3 which can be, e.g. to auto-tune a TV of a venue being visited to a game of the local sports team being played by the specific group identified by the specific group classifier P006.

Referring to Rows 4 and 5 of the decision data structure of Table A, manager system 110 can be configured to specify different actions depending on which specific group is recognized even where the first and second groups belong to a same general group classifier. Referring to Row 4, the firing condition can include the condition that the traveling group specified by the specific group ID P014 is recognized. A firing condition associated with Row 4 can be the firing condition that the traveling group having the specific group ID P017 is recognized. The specific group ID P014 specifies the Doe friends and the specific group ID P017 specifies the Smith friends. Embodiments herein recognize that users may behave differently when they travel in groups, including specific groups than they would when traveling alone.

Figure 5B:
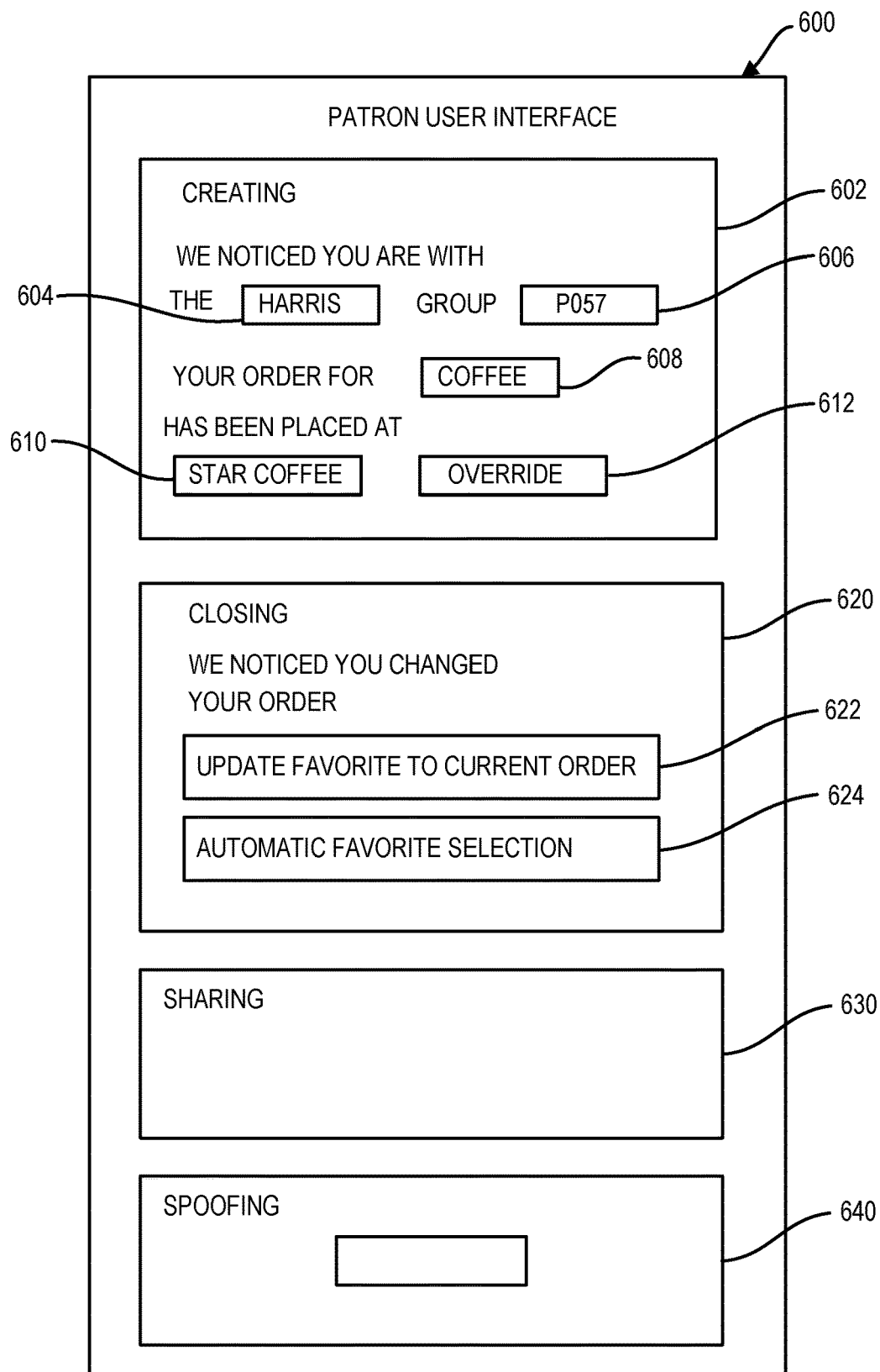
FIG. 5B depicts a patron user interface according to one embodiment.

Referring to FIG. 5B there is depicted a patron user interface 600. The patron user interface 600 can present notifications to a user and can allow a user to specify favorites, which favorites can be specified as action specifiers in a decision data structure as shown in Table A. In area 602, patron user interface 600 can display notifications to group users such as notifications that are specified as action specifiers in a decision data structure. Referring to area 604 and area 606 of area 602, patron user interface 600 can display a friendly name of the group that a certain user is traveling in as well as the specific classifier ID for the group (area 606). In areas 608 and 610 patron user interface 600 can display notifications that are specified as action specifiers and a decision data structure, such as a decision data structure as shown in Table A. Control 612 allows a user of a traveling group to override a current product ordering where an action specifier has specified that a particular product be ordered. Referring to the decision data structure of Table A, action specifiers of the decision data structure can specify "favorites" of a user. "Favorites" action specifiers can specify e.g. the auto-ordering of products and/or notifications associated to ordering of products. Embodiments herein encompass different methods for determining a favorite of a user. In one embodiment, an administrator user can specify a favorite for a user, e.g. using administrator user interface 500. In another embodiment, users of a traveling group can expressly specify their own respective favorites and these listed favorites can then be copied into a decision data structure of Table A. Referring to closing area 620 of patron user interface 600, the closing area can have features that allow a user to specify new actions to be associated with a group in which the patron user is currently traveling. For example, with respect to some action specifiers of a decision data structure of Table A, some action specifiers specify the auto-ordering of a product, e.g. as in Row 3 and Row 8 and other rows.

In area 630 there can be displayed sharing data between users of an active group e.g. in response to opening and running of peer to peer sharing between users of an active group. In area 640 a user can enter an identifier of a user who is not physically present and forming part of an active traveling group. However, manager system 110 can be configured so that when an identifier of such a user is entered into area 640 that user is "spoofed in" and manager system 110 proceeds with group determining and processing as if the user were actually part of the group.

Users can have the ability to override an order for a favorite, e.g., as shown by control 612 of patron user interface 600. Using control 622 a patron user can specify that a favorite order of the patron user has changed. Namely, so that the patron order is updated to a current product order. Thus, using control 622 a patron user can manually specify a favorite, which indicated favorite can be automatically populated as an action specifier in the decision data structure of Table A. A favorite is specified in the decision data structure of Table A as an automatic product order placement, the favorite can concurrently be specified as a notification of the order associated with the order itself. Referring to control 622 of patron user interface 600 there is depicted a manual, i.e., patron selected, favorite generation method.

In another embodiment, manager system 110 can be configured to use data analytics to automatically determine the favorite of a patron user and of patron users within a group e.g. by examination of historical data collected within data repository 112 and other data sources of system 100. The automatically determined favorites may be favorites other than favorites expressly specified by a user but rather can be data derived favorites derived by the processing of historical user data which can be data indicating habits and behaviors of users. A user can use control 624 to activate automatic determination of favorites.

Machine learning processes or other analytics processing can be run as set forth herein for determination of favorites, which favorites can be expressed as action specifiers of a decision data structure. In one embodiment, manager system 110 can examine purchase histories of users of a group when traveling as a group for determination of favorites. Manager system 110 can maintain a simple count of each users' purchasers when traveling as a group and manager system 110 can designate a favorite when a count of a certain purchase item exceeds a threshold and when the threshold is exceeded can label the highest count item as the "second favorite" and so on. Manager system 110 can tally favorite purchases for each user of a group, and in some instances can tally a common group item as a favorite (by a purchase count exceeding a threshold), e.g. a "pizza" as a favorite and second favorite (by purchase count) a "giant sub." For obtaining purchase historical data of users traveling in a group, manager system 110 can return user IDs and time periods associated to instances of historical groups using data of group classification and relationship graph data 2121. Using the returned user IDs and time periods, manager system 110 can query user data area 2122 for return of purchase historical data of the group users which purchase historical data can be processed by manager system 110.

Manager system 110 can be configured so that a decision data structure as set forth in Table A can reference for each action specifier specifying a favorite (e.g. a product order and/or notification), there is also specified a "second" favorite (and possibly a "third" favorite and so on). Manager system 110 can be in communication with venue system 120 to automatically examine an inventory of venue system 120 to make substitutions in returned action specifiers based on available inventory. For example, if an inventory of a specified favorite is running low manager system 110 can instead specify a second favorite. Accordingly, user physical traffic congestion can be avoided.

Embodiments herein can leverage historical data of users to determine behavior trends of first and second users when the first and second user have traveled together. Based on examination of historical data, manager system 110 can determine that when the Doe friends travel together, Arvis of the Doe friends likes to buy coffee and Betty of the Doe friends likes to buy hot chocolate. Accordingly, action 1 associated to Row 1 can be the action to send a notification to Arvis to buy coffee and a notification to Betty to buy hot chocolate. Based on an examination of historical data, manager system 110 can determine that when the Smith friends travels together Amy of the Smith friends likes to buy cookies and Barb of the Smith friends likes to buy cake. Accordingly, the action specified for Row 3 can be the action to send a notification to Amy to buy cookies and a notification to Barb to buy cake. The second action can be specified for Row 5, namely when manager system 110 determines that when the Smith friends are traveling together, e.g. with or without a triggering condition a specified returned action decision is the specified decision "open and run peer to peer sharing by friends". Such specified action can include an associated one or more output including an output e.g. to open a sharing application, which sharing application can control radio transceivers of respective user computer devices of the first and second users defining the group.

Referring to Row 6 of the decision data structure of Table A, the decision to send a text based notification promoting a movie night at a specific theater in a locality can be returned based on the recognition of a group classified under the general group classifier ID G001 is present. The notification action can specify that a text based notification be sent to all members of the group.

Referring to Row 7 of the decision data structure of Table A, the firing condition can be the condition that an established relationship graph for use in classifying a group of traveling users traveling together includes two or more edges with a coworker relationship being specified. Based on that firing condition being satisfied, a decision can be returned to send a notification, e.g. a text based notification to all users of the group wherein the notification promotes conference room availability in a location proximate the traveling group of users, thus promoting physical traffic congestion which could occur with a group of traveling users attempting to convene at a public location occupied concurrently by other users.

Referring to Row 8 of the decision data structure of Table A firing conditions include the firing condition that the Smith group having the traveling group ID P023 has been recognized as being active and present and in a traveling group mode. With respect to Row 8, a triggering condition can be active specifying the group of traveling users breach a geofence encompassing a larger than a location at which Acme Pizza is located. Manager system 110 based on an examination of historical data of user data area 2122 can determine that the Smith group when traveling together frequently dines at Acme Pizza. Notifications can be sent to all users of the group that Acme Pizza is approaching and that an order has been placed, ordering a new pizza from Acme Pizza. The notification according to action 1 can include a notification to venue system 120 (which in this scenario is Acme Pizza) to initiate the order. A second action decision associated to Row 8 can include the action decision to activate an oven at Acme Pizza to cook a pizza in anticipation of the arrival of the Smith group.

According to one scenario and with further reference to the decision data structure of Table A the Smith group (specific group classifier P023) can dynamically change to form the Smith friends (specific group classifier P017) and vice versa. That is, the first and second user forming the Smith group (P023) can be the same users forming the Smith friends (P017), with the Smith group being differentiated from the Smith friends only in the user C (a child of each user of the Smith friends group) has become separated from the group. Embodiments herein recognize that behaviors and favorites of users can change in dependence on their current group association, and accordingly, in the described scenario a change in a group association can trigger a change in a specified action decision. In the described scenario described in the reference to the decision data structure of Table A suppose Amy, Barb, and their daughter Carla are traveling in a group that is detected by system 100 can thus specific group P023 (Smith group) is recognized. Based on such detected condition Row 8 can be fired to trigger the noted action decisions for Row 8. However, in such a scenario Carla can be dropped off at a friend's house and system 100 can recognize Carla has become separated from the group. According to such recognition, manager system 100 can recognize that an instance of the Smith group (P023) has ceased and that an instance of the Smith friends (P017) has commenced. Embodiments herein recognize that friends (e.g. who may be significant others of one another) have different preferences and behaviors when traveling alone rather than when traveling with one or more of their common children and accordingly manager system 110 is able to respond to the changed condition. Manager system 110 in the described scenario can cancel the firing of Row 8 in the described scenario of Carla becoming separated and in place of the firing of Row 8 can instead commence the firing of Row 5 associated to an instance of the Smith friends (P017) being recognized. Manager system 110 can be configured to auto-cancel and order associated with an action decision that is cancelled by way of a change in a defined group. In the case the Smith friends (P017) pick up their daughter, a next instance of the Smith group (P023) can be defined resulting in firing of Row 8 again.

There is set forth herein according to one embodiment, a method including examining data of a plurality of traveling users, wherein at least some of the plurality of traveling users have associated mobile client computer devices, and determining, by machine logic, based on the examining that certain traveling users of the plurality of traveling users are traveling in a group; deciding, by machine logic, based on the determining that one or more action is to be performed, wherein the deciding is in dependence on a processing of historical data, the historical data specifying activities of the certain traveling users when the certain traveling users travel in a group; and providing one or more output for performance of the one or more action. There is further set forth herein according to one embodiment, the method described wherein the method includes recognizing that a certain user defining the certain traveling users traveling in a group has become separated from the certain traveling users traveling in a group, and accordingly further recognizing that there are particular traveling users of the plurality of traveling users traveling in a group, the particular traveling users having one or more user in common with the certain traveling users but being differentiated from the certain traveling users by being absent of the certain user, wherein the method includes further deciding, by machine logic, based on the recognizing that one or more changed action is to be performed, wherein the further deciding is in dependence on a processing of historical data, the historical data specifying activities of the particular traveling users when the particular traveling users travel in a group, wherein the one or more changed action includes at least one change relative to the one or more action, and wherein method includes providing one or more output for performance of the one or more changed action.

As set forth herein at block 1106 (FIG. 4) manager system 110 based on an action decision being returned using a decision data structure, e.g. as set forth in Table A, one or more manager system 110 can perform one or more output the one or more action specified by the returned action decision. In many of the use cases described, the one or more output can include one or more output for avoidance of physical user traffic congestion to avoid or improve crowd control and user safety. With any of the described action specifiers specified in Table A specifying that a notification be sent promoting a product purchase, e.g. physical product or service product, notification to a user can be provided to each user of the group and can be accompanied by a communication to a venue system 120 associated to venue 122 offering a product to activate an order for the product, which order can be subject to override by one or more user. Such processing can avoid physical user traffic congestion and improve crowd control.

Returning to the flowchart of FIG. 4, manager system 110 on completion of providing one or more output at block 1106 can proceed to block 1107 to perform machine learning training. Machine learning training can be performed to iteratively improve action specifiers of a decision data structure, such as actions specified in the decision data structure of Table A. Each action specifier specified in Table A can have associated therewith an action decision specifying process control activation to commence preparation of one or more product order for one or more user, e.g. activating an oven for food preparation, activating a robot to retrieve an item, and the like. Any product order as set forth herein can be a product order for pickup or otherwise for access by travel to a destination e.g. a venue. Products herein can be e.g. physical products or service products.

Figure 8A:
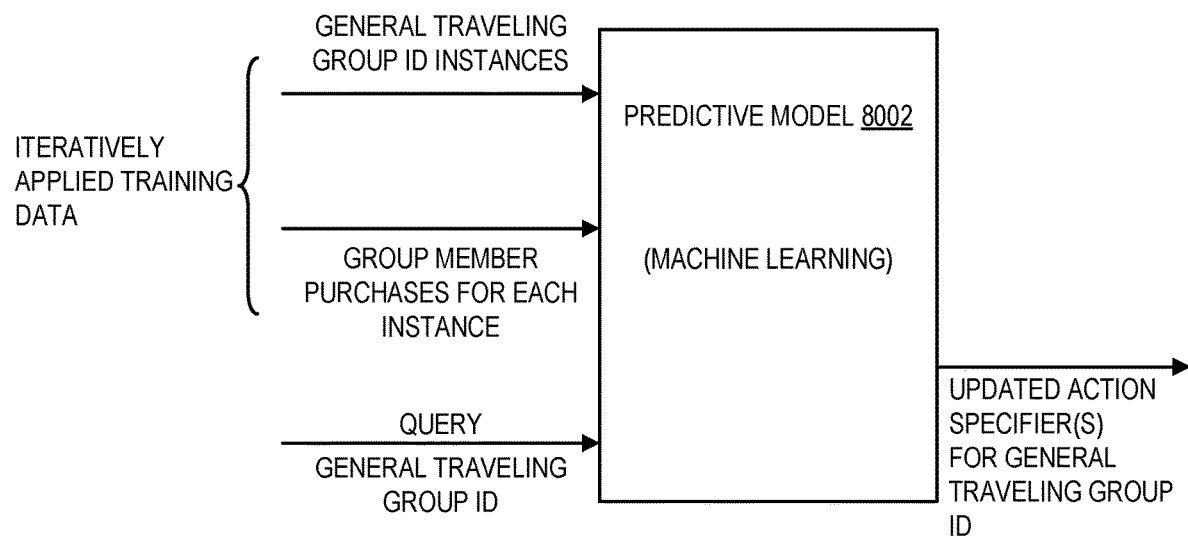
FIGS. 8A-8C depict various queried models that can be trained by machine learning according to one embodiment.
Figure 8B:
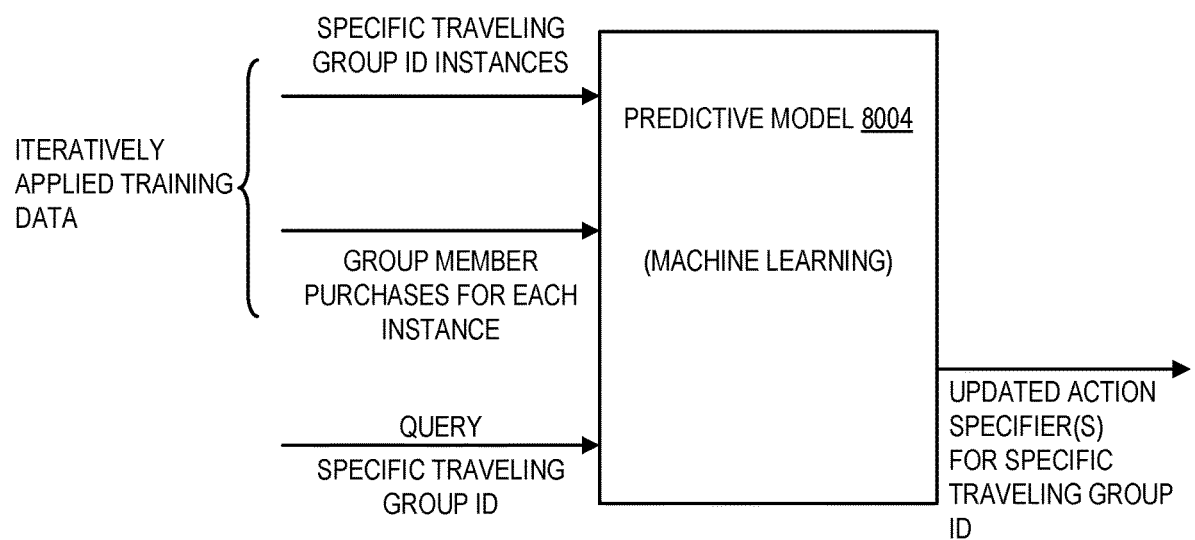
Figure 8C:
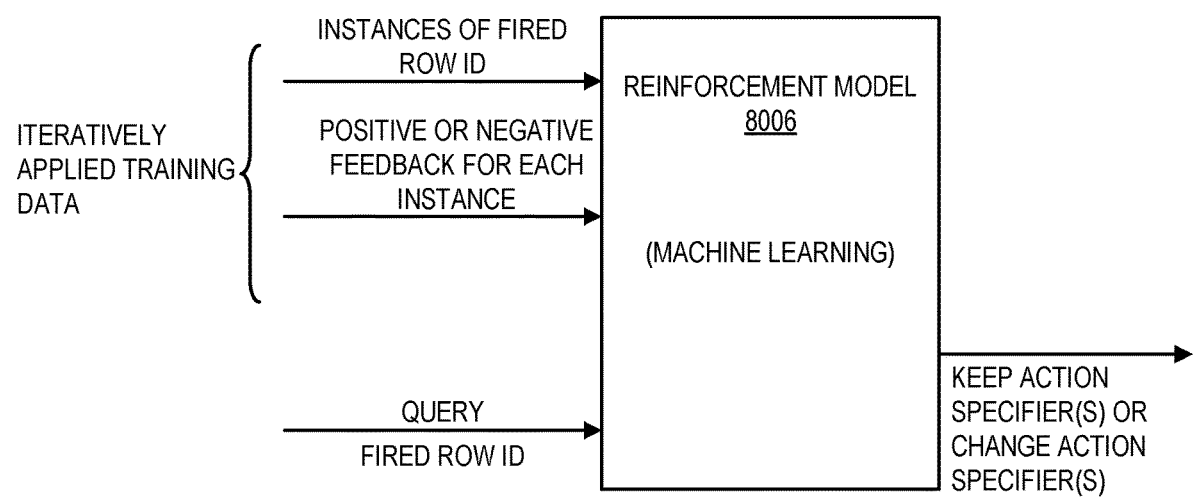

Machine learning processes that can be performed by manager system 110 are depicted in FIGS. 8A-8C. With reference to FIG. 8A, manager system 110 can train predictive model 8002 to iteratively apply training data for training predictive model 8002 can include general traveling group ID instances in combination with group member purchases for each instance. For obtaining purchase historical data of users traveling in a group, manager system 110 can return user IDs and time periods associated to instances of historical general group ID instances using data of group classification and relationship graph data 2121. Using the returned user IDs and time periods, manager system 110 can query user data area 2122 for return of purchase historical data of the group users which purchase historical data can be applied for training of predictive model 8002. Set forth herein in reference to FIG. 7, the general traveling group classifier G001 can specify a "friend" group classification. Thus, system 100 can be configured so that when manager system 110 recognizes a new traveling group of users as having the relationship graph characteristics depicted for general traveling group classification G001, manager system 110 can record a new instance for the general group classification G001 and for each such instance can process purchase data for users of the group defining the instance of the general classification G001 by application of the purchase data for training of predictive model 8002. Over time, upon being iteratively trained, predictive model 8002 will iteratively update a predicted best performing action specifier(s) for the general traveling group ID associated to the training data.

Upon being trained, predictive model 8002 can receive a query and can output a result in response to the received query. The received query referring to FIG. 8A, manager system 110 can apply a query to predictive model 8002 provided by a general traveling group ID associated to the applied training data used for training predictive model 8002. Thus, if the applied training data is associated to the general group classifier ID G001, the applied query can be the group classifier G001. Predictive model 8002 in response to receiving the applied query can return an updated action specifier to update a specified one or more action associated to the general traveling group ID. For example, Row 6 of the decision data structure of Table A specifies an action associated to the recognition of the traveling group having a general traveling group classifier G001 (friend). In one embodiment, in reference to FIG. 8A classification specifiers can be mapped to predicted purchases predicted for members of the traveling group classified by general classifier. Thus, in the case the predicted purchase is the product pizza specified actions can include, e.g. notifications to users promoting pizza and/or notifying of a purchase order for pizza and/or notifications to a venue to place an order for pizza and also such actions to activate processes such as activating an oven for cooking of pizza. If the predicted purchase based on the training data including purchase data is the purchase of coffee, classifications can be specified in action specifiers specifying notifications notifying of the ordering of coffee, actions to order coffee, and actions e.g. via robot control to serve the coffee.

FIG. 8B depicts a machine learning process wherein predictive model 8004 is iteratively trained. In reference to FIG. 8B predictive model 8004 can be iteratively trained. The applied training data can include specific traveling group ID instances in combination with group member purchases for each instance of the specific traveling group ID. For obtaining purchase historical data of users traveling in a group, manager system 110 can return user IDs and time periods associated to instances of historical groups using data of group classification and relationship graph data 2121. Using the returned user IDs and time periods, manager system 110 can query user data area 2122 for return of purchase historical data of the group users which purchase historical data can be applied for training of predictive model 8004. For example, referring to the decision data structure of Table A, Row 4 specifies the specific traveling group P014 specifying the Doe friends. Thus, manager system 110 can be configured so that each time an instance of the Doe friends traveling group is recognized, the purchase activity of the Doe friends can be recorded and applied as training data to predictive model 8004 so that over time predictive model 8004 is able to predict a next purchase of first and second users defining the Doe friends when the Doe friends travel as a group.

Predictive model 8004 on being trained can be responsive to a query to return updated action specifier(s) for a specific traveling group ID. In the described example, the Doe friends ID P014 can be applied as a query to predictive model and in response predictive model 8004 can return an updated action specifier(s) for the Doe friends having the associated specific group classifier P014. Updated action specifier(s) returned by predictive model 8004 can be mapped to predicted next purchases of users defining the Doe friends. Using predictive model 8004 manager system 110 can ascertain purchase habits of first and second users defining a registered group of traveling users when those users travel as a group. For example, in the described use case manager system 110 using predictive model 8004 can determine that when Arvis and Betty of the Doe friends travel together Arvis tends to buy coffee and Betty tends to buy hot chocolate. With use of predictive model 8004, manager system 110 can intelligently adapt as the purchase habits of Arvis and Betty evolve over time. With use of predictive models 8002 and 8004 manager system 110 can maintain track of "favorites" as set forth herein as well as "second favorites" and "third favorites" and so on.

In reference to FIG. 8C, another machine learning process that can be performed by manager system 110 by activation of machine learning process 118 (FIG. 1) is described. Referring to FIG. 8C, manager system 110 can iteratively train reinforcement model 8006 using iteratively applied training data. The iteratively applied training data can include instances of a fired row ID and a positive or negative feedback associated with each instance. Thus, whenever Row X of the decision data structure of Table A is fired to return a specified one or more action, a positive or negative feedback associated to the one or more action can be applied as training data to train reinforcement model 8006. The positive or negative feedback can vary depending on the specified action. Where the action specified is a notification promoting a product, the positive or negative action can specify whether the promoted product was actually purchased. With the successful purchase of the product indicating a positive feedback for the notification and failure to purchase indicating a negative feedback associated with the notification.

Upon being trained, reinforcement model 8006 can be responsive to queries by manager system 110. Manager system 110 can be configured to iteratively query the predictive model 8002 as depicted in FIG. 8A, the predictive model 8004 as depicted in FIG. 8B, and the reinforcement model 8006 as depicted in FIG. 8C at intervals, e.g. configurable intervals configurable with use of administrator user interface 500 of FIG. 5A. In response to being queried with a row X ID, reinforcement model 8002 can return a response to provide one or more action specifier for row X. The response can specify that the current action is to be maintained, e.g. in the case the feedback over the course of iterations for the specified action has been positive or can specify an action specifier(s), e.g. in the case that over the course of iterations there has been negative feedback associated with the current action(s). A new action specifier can be obtained from a list, e.g. an administrator authored list authored using administrator user interface 500 or an automatically generated list generated with use of machine learning process.

Various available tools, libraries, and/or services can be utilized for implementation of predictive model 8002, predictive model and reinforcement model 8006. For example, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation. A machine learning service provided by IBM® WATSON® can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models.

Embodiments herein recognize that humans are creatures of habit. People tend to order the same meals at our favorite restaurants and like our coffee a special way. Embodiments herein recognize that people have habits especially when they are with others, for example, friends and family. Embodiments herein can provide a fast and easy way for customers to order "favorited" items based on the people they are with. Manager system 110 can identify the presence of traveling groups and can track purchase history of users when defining an active traveling group.

Embodiments herein recognize that many mobile applications allow users to define "favorites" to make ordering easier. Embodiments herein feature actions that are automatically performed when a user travels with a group of a traveling users recognized as having a certain characteristic (e.g. an edge label specifying a relationship between users), having a recognized generic group classifier or a recognized specific group classifier.

According to one embodiment set forth herein, there is set forth herein the following: (1) users can shop at their favorite venues e.g. stores and restaurants; (2) Manager system 110 can track each purchase of a user along with the store location and store information; (3) Manager system 110 when a particular purchase by a user reaches a threshold value above other purchases made at the establishment, marks the purchase as a "favorite" of the user; (4) The user approaches the establishment and a geofence established at the venue border can be triggered; (5) Manager system 110 determines who the user is traveling with and can responsively e.g. using a decision data structure as shown in Table A can return a specifier for the group favorite; (6) Manager system 110 prompts the user "Would you like to order the group favorite today" 8. If the user says yes, the order is placed, dividing the bill according to who traditionally gets what within the group, resulting in faster checkout (7) If the user says no, the user may be prompted with a 2nd top favorite the user may order as if the favorite was never suggested (traditional way).

As other orders are placed, if the top favorite changes, manager system 110 can modify the notification to suggest the current top favorite. This could be broken down at a per location basis. If manager system 110 detects a new group of people, the system can auto-merge "favorited" items to create a single purchase order for all of the people. For example, if Bob usually gets hot chocolate, and Mary gets Coffee, manager system 110 can send alerts to Mary and Bob to buy hot chocolate and coffee together. In addition, if one of the users in the group decide to purchase the grouped items, the other user e.g. via area 630 as shown in FIG. 6B can be alerted that they were treated (For example, if Bob buys the coffee and hot chocolate, manager system 110 can alert Mary that Bob treated her).

Manager system 110 may also allow a person to manually enter in the name of person to capture their favorite items at the current location, e.g. in "spoofing" area 640 as shown in FIG. 6B. For example, Bob is at Starbucks in Baltimore, Md. and he would like to get the favorited items for Suzy at that particular location so he can bring her breakfast in Bethesda, Md.! Bob can yield such result by spoofing in Suzy into area 640 of patron user interface 600. Manager system 110 can be configured to adjust the "favorite" items based on the inventory of the location. For example, if a person walks into a restaurant and usually orders chicken, the system would look to see if there is chicken for pickup (favorite). If not, manager system 110 might suggest a new item (second favorite) so the user does not have to wait long for a new batch to be made.

Certain embodiments herein may offer technical computing advantages involving computing advantages to address problem arising the realm of computer networks. Particularly, computer networks operating to provide services to a plurality of users capable of communicating with the network. Embodiments herein feature examination and classification of users traveling within a group of users wherein each or some of the users can include associated user computer devices which can be provided by mobile computer devices. Embodiments herein can feature artificial intelligence (AI) decision processes return of decisions that can improve user traffic flow and avoid dangerous user congestion conditions. A fundamental aspect of the computer networks is the interaction with interfaces which can include human user interfaces. Embodiments herein can improve human user interfacing operations of computer networks. For example, one or more output can be automatically provided by a computer network in response to certain users traveling together provided one or more output can include e.g. to send a notification and/or one or more output to activate a process, e.g. to open and run an application running on a computing node to control a radio transceiver, e.g. to conduct a peer to peer data sharing session and/or to activate another process such as a machine learning process for preparation of a product. Machine learning processes can be employed so that action decisions returned can be optimized over time based on user behavior which can change over time. Machine learning processes can be performed for increased accuracy and for reduction of reliance on rules based criteria and thus reduce computational overhead. For enhancement of computational accuracies, embodiments can feature computational platforms existing only in the realm of computer networks and computer systems such as AI platforms and machine learning platforms. Embodiments herein can employ data structuring processes, e.g. employing natural language processing (NLP) and recognition processing for transforming unstructured data into a form optimized for computerized processing. Embodiments herein can examine data from diverse data sources such as data sources of mobile devices and venues include data sources that process radio signals for location determination of users. Data sources can also include video data sources. Embodiments herein can include AI processing platforms featuring improved processes to transform unstructured data into structured form permitting computer based analytics and predictive decision making. Embodiments herein can include various data structures for use in returning action decisions such as use of one or more decision data structure that cognitively maps action conditions involving group characteristics to action decisions. Embodiments herein can also include use of relationship graphs having nodes that specify users of a system and edges that specify relationships between users of a system. Further, embodiments herein can feature use of a relationship graphs in the performance of examining data for determination of classifiers associated to recognize groups and for use in defining classifications of previously recorded general groups of users and/or specific groups of users who are traveling users in a group. The use of relationship graphs reduces resource utilization including memory utilization by alleviating or reducing required queries for the association of decision deriving data.

Figure 9:
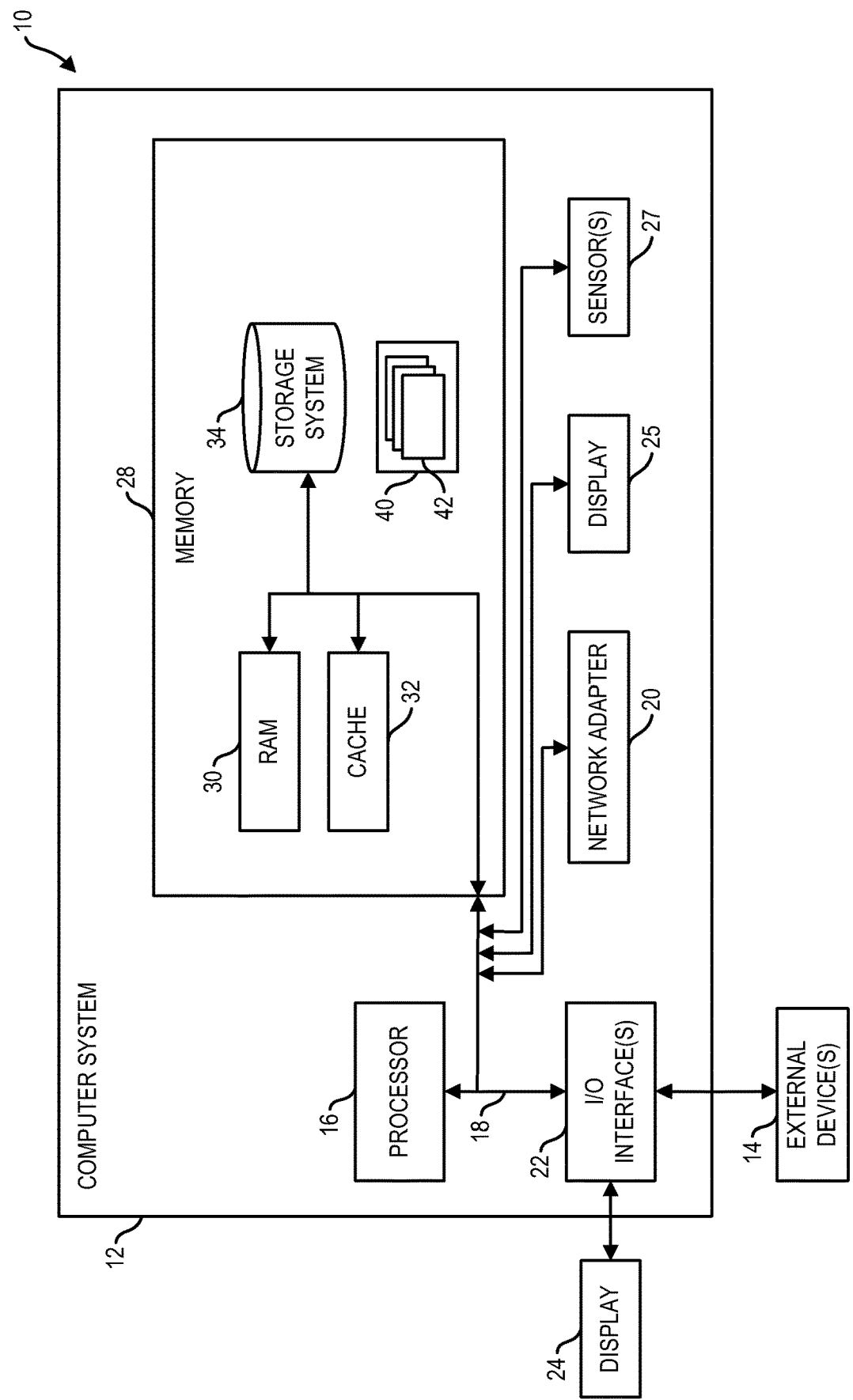
FIG. 9 depicts a computing node according to one embodiment.
Figure 10:
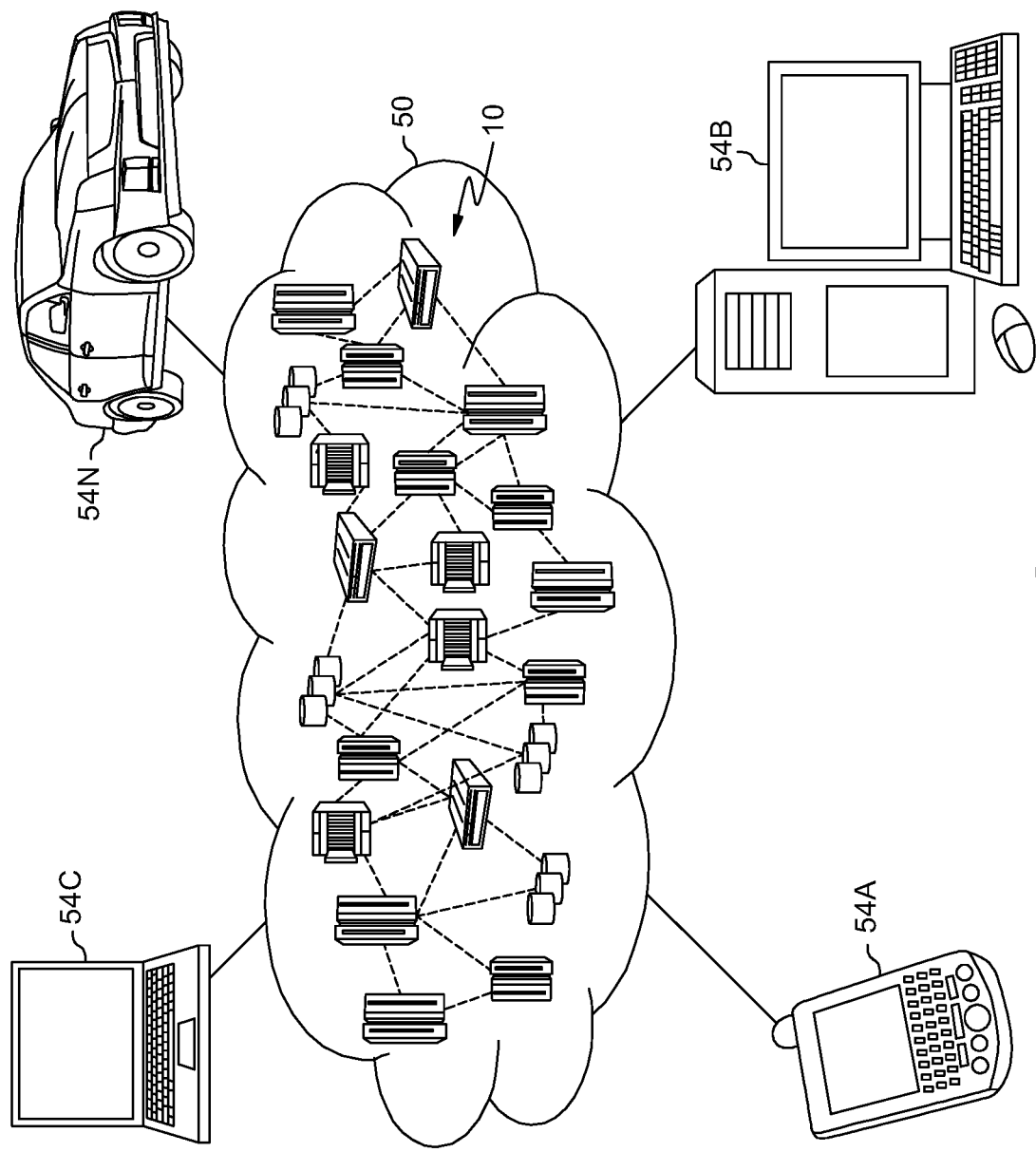
FIG. 10 depicts a cloud computing environment according to one embodiment.
Figure 11:
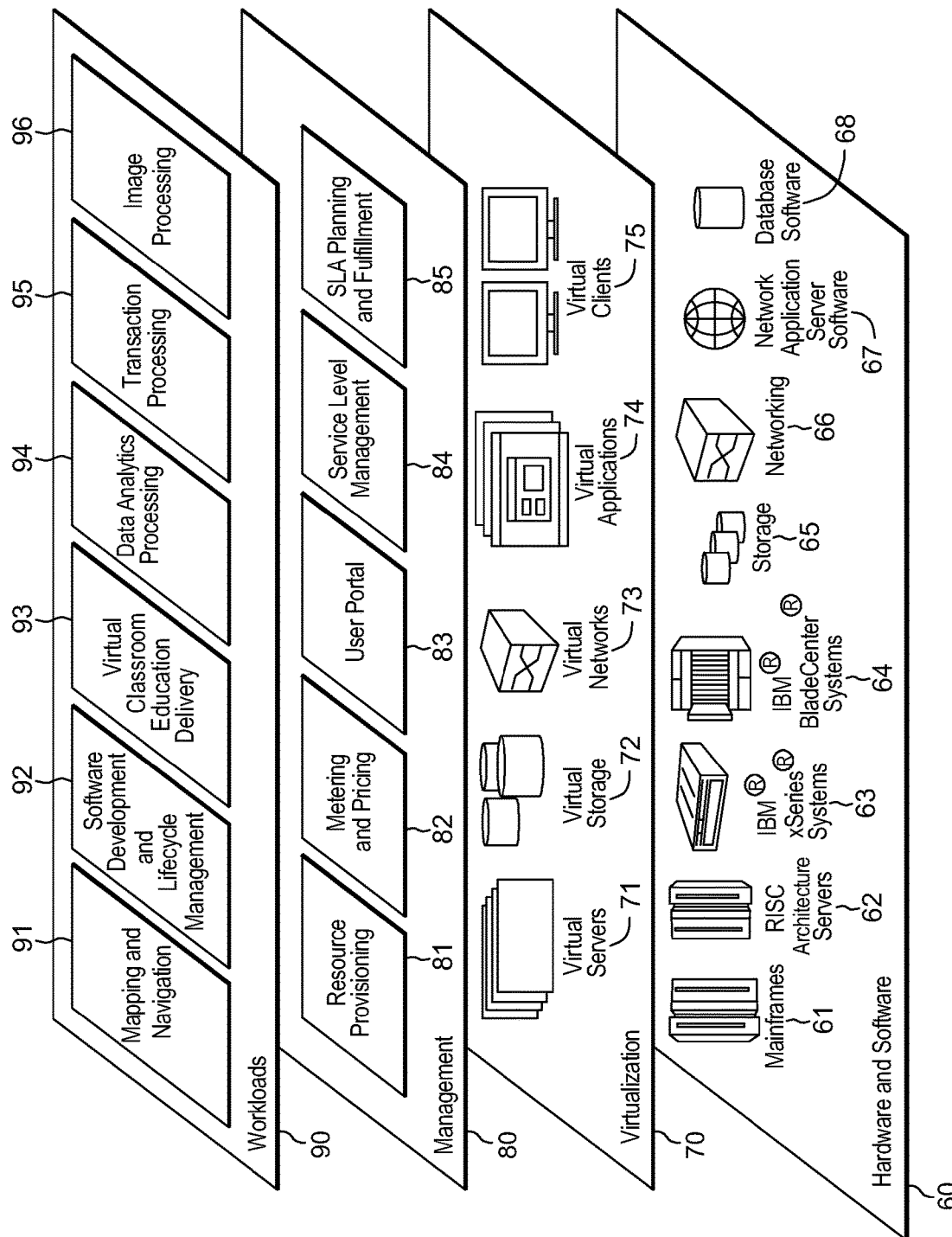
FIG. 11 depicts abstraction model layers according to one embodiment.

FIGS. 9-11 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 9, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 9, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 10-11.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 2 and functions described with reference to method 300 of FIG. 3 and functions described with reference to manager system 110 as set forth in the flowchart of FIG. 4. In one embodiment, one or more client computer device 130A-130Z can include one or more computing node 10 and can include one or more program 40 for performing functions described with reference to one or more client computer device 130A-130Z as set forth in the flowchart of FIG. 4. In one embodiment, venue system 120 can include one or more program 40 for performing functions described with reference to venue system 120 of FIG. 4. In one embodiment, the computing node based systems and devices depicted in FIG. 1 can include one or more program for performing functions described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 10 computing node 10 is described as being implemented in a cloud computing environment and accordingly is referred to as a cloud computing node in the context of FIG. 10.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for identifying traveling groups of users and performing associated actions as set forth herein. The processing components 96 can be implemented with use of one or more program 40 described in FIG. 9.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
examining data of a plurality of traveling users, wherein at least some of the plurality of traveling users have associated mobile client computer devices, and determining, based on the examining that certain traveling users of the plurality of traveling users are traveling in a group;

deciding, based on the determining that one or more action is to be performed, wherein the deciding is in dependence on a processing of historical data, the historical data specifying activities of the certain traveling users when the certain traveling users travel in a group; and providing one or more output for performance of the one or more action, wherein the method includes classifying the certain traveling users as belonging to a previously registered specific group of traveling users having a previously recorded associated specific group ID, wherein the deciding includes using a decision data structure that cognitively maps one or more action specifier to the specific group ID, and wherein the specified action is determined using a machine learning trained predictive model that is iteratively trained using training data, the predictive model predicting purchases made by respective first and second users associated to the specific group ID.

2. The computer implemented method of claim 1, wherein the processing of historical data includes processing of product purchase historical data of the certain traveling users when the certain traveling users travel in a group, and wherein the method includes classifying the certain traveling users as belonging to a previously registered specific group classification of traveling users having a previously recorded associated specific group ID, and wherein the one or more action is an action to automatically order a favorite product of a user of the previously registered specific group classification.

3. The computer implemented method of claim 1, wherein method includes classifying the certain traveling users as belonging to a previously registered specific group classification of traveling users having a previously recorded associated specific group ID, wherein the one or more action specifier specifies an action to automatically order a favorite product of a user of the previously registered specific group classification, wherein the processing of historical data includes processing of product purchase historical data of the certain traveling users when the certain traveling users travel in a group, and wherein the one or more action includes automatically ordering for pickup a favorite product of one or more user of the certain traveling users as determined by the processing of product purchase historical data of the certain traveling users when the certain traveling users travel in a group.

4. The computer implemented method of claim 1, wherein the method includes recognizing that a certain user defining the certain traveling users traveling in a group has become separated from the certain traveling users traveling in a group, and accordingly further recognizing that there are particular traveling users of the plurality of traveling users traveling in a group, the particular traveling users having one or more user in common with the certain traveling users but being differentiated from the certain traveling users by being absent of the certain user.

5. The computer implemented method of claim 1, wherein the processing of historical data includes processing of product purchase historical data of the certain traveling users when the certain traveling users travel in a group, and wherein the one or more action includes automatically ordering for pickup a favorite product of one or more user of the certain traveling users as determined by the processing of product purchase historical data of the certain traveling users when the certain traveling users travel in a group.

6. The computer implemented method of claim 1, wherein the processing of historical data includes processing of product purchase historical data of the certain traveling users when the certain traveling users travel in a group, and wherein the one or more action includes sending a notification to the one or more user of the certain traveling users as determined by the processing of product purchase historical data of the certain traveling users when the certain traveling users travel in a group, the notification including a text based notice that a favorite product for pickup has been ordered to define an order for pickup, and wherein the notification is accompanied by a user interface control that permits the one or more user to override the order for pickup.

7. The computer implemented method of claim 1, wherein the certain traveling users of the plurality of traveling determined to be traveling in a group have been previously recognized as a group of users traveling in a group during a first instance of the certain traveling users traveling in a group, and in a second instance of the certain traveling users traveling in a group, wherein the second instance is prior in time to a current instance of the certain traveling users traveling in a group in which the determining is performed, and wherein the first instance is prior in time to the second instance, wherein the processing of historical data includes processing of product purchase historical data of the certain traveling users when the certain traveling users travel in a group includes processing of historical data of each of the first instance and the second instance.

8. The computer implemented method of claim 1, wherein the examining data of a plurality of traveling users includes examining location data of users of the plurality of traveling users, wherein the determining based on the examining that certain traveling users of the plurality of traveling users are traveling in a group includes examining a history of locations of the certain traveling users over time, wherein the determining includes classifying the group as belonging to a previously registered general group classification of traveling users.

9. The computer implemented method of claim 1, wherein the method includes classifying the certain traveling users as belonging to a previously registered specific group classification of traveling users having a previously recorded associated specific group ID, and wherein the one or more action is an action to automatically order a favorite product of a user of the previously registered specific group classification.

10. The computer implemented method of claim 1, wherein the method includes using image data processing to perform identification of users defining the certain traveling users.

11. The computer implemented method of claim 1, wherein the examining includes establishing a relationship graph that characterizes the certain group of traveling users, wherein the relationship graph includes nodes that specify users of the group of traveling users, wherein edges of the relationship graph specify relationships between users defining the group of traveling users, and wherein the method includes classifying the certain group of traveling users as belonging to a previously registered classification, the classifying including determining that the established relationship graph established by the establishing has characteristics in common with a previously registered relationship graph associated to the classification.

12. The computer implemented method of claim 1, wherein the deciding includes using a decision data structure that cognitively maps an action condition provided by an established relationship graph having a certain edge characteristic to an action decision specifier associated to the edge characteristic, wherein the certain traveling users include a first user, and wherein the method includes providing a user interface for use by the first user, wherein the method includes receiving entered data of the first user into the user interface specifying a second user who is remote from the first user, and in response to the receiving, logically associating the second user to the certain traveling users of the plurality of traveling users who are traveling in the group.

13. The computer implemented method of claim 1, wherein the one or more action is to perform automatically placing an order for a product for a particular user of the certain traveling users, wherein placing the order includes using a decision data structure that cognitively maps a classifier for the certain traveling users to an action specifier specifying product order placement, the product order placement specifying a favorite product and a second favorite product for the particular user, wherein the method includes examining an inventory of products at a venue, and wherein the automatically placing an order includes automatically placing an order to the second favorite product in response to the examining an inventory indicating that an inventory of the favorite product is below a threshold.

14. The computer implemented method of claim 1, wherein the examining is performed in response to a particular user of the certain traveling users breaching a geofence of a venue, and wherein the one or more action is to perform automatically placing an order for a product available from within the venue.

15. The computer implemented method of claim 1, wherein the processing historical data includes applying purchase historical data of the traveling group of users as training data by machine learning to a predictive model so that when the predictive model is trained, the predictive model predicts a favorite product of the group of traveling users.

16. A computer program product comprising: a computer readable storage device readable by one or more processing circuit and storing instructions for execution by one or more processor for performing a method comprising:
examining data of a plurality of traveling users, wherein at least some of the plurality of traveling users have associated mobile client computer devices, and determining based on the examining that certain traveling users of the plurality of traveling users are traveling in a group;
deciding based on the determining that one or more action is to be performed, wherein the deciding is in dependence on a processing of historical data, the historical data specifying activities of the certain traveling users when the certain traveling users travel in a group; and
providing one or more output for performance of the one or more action, wherein the method includes classifying the certain traveling users as belonging to a previously registered specific group of traveling users having a previously recorded associated specific group ID, wherein the deciding includes using a decision data structure that cognitively maps one or more action specifier to the specific group ID, and wherein the specified action is determined using a machine learning trained predictive model that is iteratively trained using training data, the predictive model predicting purchases made by respective first and second users associated to the specific group ID.

17. The computer program product of claim 16, wherein the method includes recognizing that a certain user defining the certain traveling users traveling in a group has become separated from the certain traveling users traveling in a group, and accordingly further recognizing that there are particular traveling users of the plurality of traveling users traveling in a group, the particular traveling users having one or more user in common with the certain traveling users but being differentiated from the certain traveling users by being absent of the certain user, wherein the method includes further deciding based on the recognizing that one or more changed action is to be performed, wherein the further deciding is in dependence on a processing of historical data, the historical data specifying activities of the particular traveling users when the particular traveling users travel in a group, wherein the one or more changed action includes at least one change relative to the one or more action, and wherein method includes providing one or more output for performance of the one or more changed action, wherein the certain traveling users of the plurality of traveling determined to be traveling in a group have been previously recognized as a group of users traveling in a group during a first instance of the certain traveling users traveling in a group, and in a second instance of the certain traveling users traveling in a group, wherein the second instance is prior in time to a current instance of the certain traveling users traveling in a group in which the determining is performed, and wherein the first instance is prior in time to the second instance, wherein the processing of historical data includes processing of product purchase historical data of the certain traveling users when the certain traveling users travel in a group, and wherein the one or more action includes automatically ordering for pickup a favorite product of one or more user of the certain traveling users as determined by the processing of product purchase historical data of the certain traveling users when the certain traveling users travel in a group, wherein the processing of historical data includes processing of product purchase historical data of the certain traveling users when the certain traveling users travel in a group includes processing of historical data of each of the first instance and the second instance, wherein training data for training the predictive model includes purchase historical data of the certain traveling users when the certain traveling users travel in a group during a first instance of the certain traveling users traveling in a group, wherein training data for training the predictive model includes purchase historical data of the certain traveling users when the certain traveling users travel in a group during a second instance of the certain traveling users traveling in a group, the second instance being separated in time from the first instance.

18. A system comprising:
a memory;
at least one processor in communication with the memory; and
program instructions executable by one or more processor via the memory to perform a method comprising:
examining data of a plurality of traveling users, wherein at least some of the plurality of traveling users have associated mobile client computer devices, and determining based on the examining that certain traveling users of the plurality of traveling users are traveling in a group;
deciding based on the determining that one or more action is to be performed, wherein the deciding is in dependence on a processing of historical data, the historical data specifying activities of the certain traveling users when the certain traveling users travel in a group; and providing one or more output for performance of the one or more action, wherein the method includes classifying the certain traveling users as belonging to a previously registered specific group of traveling users having a previously recorded associated specific group ID, wherein the deciding includes using a decision data structure that cognitively maps one or more action specifier to the specific group ID, and wherein the specified action is determined using a machine learning trained predictive model that is iteratively trained using training data, the predictive model predicting purchases made by respective first and second users associated to the specific group ID.

19. The system of claim 18, wherein the examining is performed in response to a particular user of the certain traveling users breaching a geofence of a venue, and wherein the one or more action is to perform automatically placing an order for a product available from within the venue.

20. The system of claim 18, wherein the processing historical data includes applying purchase historical data of the traveling group of users as training data by machine learning to a predictive model so that when the predictive model is trained, the predictive model predicts a favorite product of the group of traveling users.

* * * * *